(12) United States Patent
Komine et al.

(10) Patent No.: US 12,091,723 B2
(45) Date of Patent: *Sep. 17, 2024

(54) GALVANIZED STEEL SHEET, MEMBER, AND METHOD FOR PRODUCING THEM

(71) Applicant: JFE STEEL CORPORATION, Tokyo (JP)

(72) Inventors: Shinsuke Komine, Tokyo (JP); Tatsuya Nakagaito, Tokyo (JP); Kentaro Sato, Tokyo (JP); Tomohiro Sakaidani, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/011,090

(22) PCT Filed: Jun. 30, 2021

(86) PCT No.: PCT/JP2021/024846
§ 371 (c)(1),
(2) Date: Dec. 16, 2022

(87) PCT Pub. No.: WO2022/004820
PCT Pub. Date: Jan. 6, 2022

(65) Prior Publication Data
US 2023/0243014 A1   Aug. 3, 2023

(30) Foreign Application Priority Data
Jun. 30, 2020   (JP) .................. 2020-113063

(51) Int. Cl.
*C22C 33/04* (2006.01)
*B23K 11/00* (2006.01)
(Continued)

(52) U.S. Cl.
CPC ............. *C21D 9/46* (2013.01); *B23K 11/0026* (2013.01); *B23K 11/11* (2013.01); *B23K 11/166* (2013.01);
(Continued)

(58) Field of Classification Search
CPC ........ C21D 2211/001; C21D 2211/002; C21D 2211/005; C21D 2211/008; C21D 1/18;
(Continued)

(56) References Cited

U.S. PATENT DOCUMENTS

| 2011/0182748 A1* | 7/2011 | Kwok | .................. F04D 29/023 |
| | | | 416/241 R |
| 2019/0169729 A1* | 6/2019 | Yokoyama | .............. C22C 38/06 |
| 2023/0287553 A1* | 9/2023 | Komine | ............... C21D 8/0205 |

FOREIGN PATENT DOCUMENTS

| CN | 101061241 A | 10/2007 |
| CN | 101932744 A | 12/2010 |

(Continued)

OTHER PUBLICATIONS

Sep. 11, 2023 Extended Search Report in European Patent Application No. 21834301.0.

(Continued)

*Primary Examiner* — Michael E. La Villa
(74) *Attorney, Agent, or Firm* — Oliff PLC

(57) ABSTRACT

A galvanized steel sheet includes: a steel sheet having a chemical composition satisfying an equivalent carbon content Ceq of 0.35% or more and less than 0.60%, and a specified steel microstructure; and a galvanized layer on a surface of the steel sheet. The retained austenite has a solute C content of 0.6% or more by mass, and retained austenite grains with an aspect ratio of less than 2.0 constitute 50% or more of all retained austenite grains. In 90-degree bending at a curvature radius/thickness ratio of 4.2 in a rolling (L)

(Continued)

direction with respect to an axis extending in a width (C) direction, an L cross section in a 0 to 50 μm region from a surface of the steel sheet on a compression side has a number density of voids of 1000/mm² or less, and the galvanized steel sheet has a tensile strength of 590 MPa or more.

16 Claims, 4 Drawing Sheets

(51) Int. Cl.
| | |
|---|---|
| B23K 11/11 | (2006.01) |
| B23K 11/16 | (2006.01) |
| B32B 15/01 | (2006.01) |
| B32B 15/04 | (2006.01) |
| B32B 15/18 | (2006.01) |
| C21D 1/18 | (2006.01) |
| C21D 1/19 | (2006.01) |
| C21D 1/25 | (2006.01) |
| C21D 6/00 | (2006.01) |
| C21D 8/02 | (2006.01) |
| C21D 9/46 | (2006.01) |
| C22C 38/00 | (2006.01) |
| C22C 38/02 | (2006.01) |
| C22C 38/04 | (2006.01) |
| C22C 38/06 | (2006.01) |
| C22C 38/08 | (2006.01) |
| C22C 38/12 | (2006.01) |
| C22C 38/14 | (2006.01) |
| C22C 38/16 | (2006.01) |
| C22C 38/18 | (2006.01) |
| C22C 38/20 | (2006.01) |
| C22C 38/22 | (2006.01) |
| C22C 38/24 | (2006.01) |
| C22C 38/26 | (2006.01) |
| C22C 38/28 | (2006.01) |
| C22C 38/32 | (2006.01) |
| C22C 38/34 | (2006.01) |
| C22C 38/38 | (2006.01) |
| C22C 38/40 | (2006.01) |
| C22C 38/42 | (2006.01) |
| C22C 38/44 | (2006.01) |
| C22C 38/46 | (2006.01) |
| C22C 38/48 | (2006.01) |
| C22C 38/50 | (2006.01) |
| C22C 38/54 | (2006.01) |
| C22C 38/58 | (2006.01) |
| C22C 38/60 | (2006.01) |
| C23C 2/02 | (2006.01) |
| C23C 2/06 | (2006.01) |
| C23C 2/28 | (2006.01) |
| C23C 2/40 | (2006.01) |
| C23C 28/00 | (2006.01) |
| C23C 28/02 | (2006.01) |
| C23C 30/00 | (2006.01) |
| C25D 3/22 | (2006.01) |
| C25D 5/36 | (2006.01) |
| C25D 5/50 | (2006.01) |
| C25D 7/06 | (2006.01) |
| B23K 101/00 | (2006.01) |
| B23K 101/28 | (2006.01) |
| B23K 101/34 | (2006.01) |
| B23K 103/04 | (2006.01) |

(52) U.S. Cl.
CPC .......... *B32B 15/013* (2013.01); *B32B 15/015* (2013.01); *B32B 15/04* (2013.01); *B32B 15/043* (2013.01); *B32B 15/18* (2013.01); *C21D 1/18* (2013.01); *C21D 1/185* (2013.01); *C21D 1/19* (2013.01); *C21D 1/25* (2013.01); *C21D 6/001* (2013.01); *C21D 6/002* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0263* (2013.01); *C21D 8/0273* (2013.01); *C21D 8/0278* (2013.01); *C22C 33/04* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/18* (2013.01); *C22C 38/20* (2013.01); *C22C 38/22* (2013.01); *C22C 38/24* (2013.01); *C22C 38/26* (2013.01); *C22C 38/28* (2013.01); *C22C 38/32* (2013.01); *C22C 38/34* (2013.01); *C22C 38/38* (2013.01); *C22C 38/40* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C22C 38/58* (2013.01); *C22C 38/60* (2013.01); *C23C 2/02* (2013.01); *C23C 2/0224* (2022.08); *C23C 2/06* (2013.01); *C23C 2/28* (2013.01); *C23C 2/285* (2013.01); *C23C 2/29* (2022.08); *C23C 2/40* (2013.01); *C23C 28/021* (2013.01); *C23C 28/025* (2013.01); *C23C 28/3225* (2013.01); *C23C 30/00* (2013.01); *C23C 30/005* (2013.01); *C25D 3/22* (2013.01); *C25D 5/36* (2013.01); *C25D 5/50* (2013.01); *C25D 7/0614* (2013.01); *B23K 2101/006* (2018.08); *B23K 2101/28* (2018.08); *B23K 2101/34* (2018.08); *B23K 2103/04* (2018.08); *C21D 2211/001* (2013.01); *C21D 2211/002* (2013.01); *C21D 2211/005* (2013.01); *C21D 2211/008* (2013.01); *Y10T 428/12792* (2015.01); *Y10T 428/12951* (2015.01); *Y10T 428/12958* (2015.01); *Y10T 428/12965* (2015.01); *Y10T 428/12972* (2015.01)

(58) Field of Classification Search
CPC . C21D 1/185; C21D 1/19; C21D 1/25; C21D 9/46; C21D 6/001; C21D 6/002; C21D 6/005; C21D 6/008; C21D 8/0205; C21D 8/0226; C21D 8/0236; C21D 8/0263; C21D 8/0273; C21D 8/0278; B23K 11/0026; B23K 11/11; B23K 11/166; B23K 2101/006; B23K 2101/28; B23K 2101/34; B23K 2103/04; B32B 15/013; B32B 15/015; B32B 15/04; B32B 15/043; B32B 15/18; C22C 33/04; C22C 38/02; C22C 38/001; C22C 38/005; C22C 38/002; C22C 38/008; C22C 38/04; C22C 38/06; C22C 38/08; C22C 38/12; C22C 38/14; C22C 38/16; C22C 38/28; C22C 38/32; C22C 38/34; C22C 38/38; C22C 38/58; C22C 38/60; C22C 38/18; C22C 38/20; C22C 38/22; C22C 38/24; C22C 38/26; C22C 38/40; C22C 38/42; C22C 38/44; C22C 38/46; C22C 38/48; C22C 38/50; C22C 38/54; C23C 2/02; C23C 2/0224; C23C 2/06; C23C 2/28; C23C 2/29; C23C 2/40; C23C 2/285; C23C 30/00; C23C 30/005; C23C 28/025; C23C 28/021; C23C 28/3225; C25D 3/22; C25D 5/36; C25D 5/50; C25D 7/0614; Y10T 428/12792; Y10T 428/12958; Y10T 428/12972; Y10T 428/12951; Y10T 428/12965

See application file for complete search history.

(56) References Cited

FOREIGN PATENT DOCUMENTS

| | | | |
|---|---|---|---|
| CN | 102348821 | A | 2/2012 |
| CN | 107075627 | A | 8/2017 |
| CN | 107109571 | A | 8/2017 |
| CN | 107208206 | A | 9/2017 |
| CN | 107208236 | A | 9/2017 |
| CN | 108603269 | A | 9/2018 |
| CN | 108779536 | A | 11/2018 |
| CN | 110121568 | A | 8/2019 |
| EP | 1829981 | A1 | 9/2007 |
| EP | 2258886 | A1 | 12/2010 |
| EP | 2407568 | A1 | 1/2012 |
| EP | 2738280 | A1 | 6/2014 |
| EP | 3178956 | A1 | 6/2017 |
| EP | 3216887 | A1 | 9/2017 |
| EP | 3219821 | A1 | 9/2017 |
| EP | 3219822 | A1 | 9/2017 |
| EP | 3257962 | A1 | 12/2017 |
| EP | 3279362 | A1 | 2/2018 |
| EP | 3415653 | A1 | 12/2018 |
| EP | 3447159 | A1 | 2/2019 |
| JP | H11-189839 | A | 7/1999 |
| JP | 2006-089804 | A | 4/2006 |
| JP | 2009-19258 | A | 1/2009 |
| JP | 2009-151165 | A | 7/2009 |
| JP | 2010-236066 | A | 10/2010 |
| JP | 2012-031462 | A | 2/2012 |
| JP | 2015-175061 | A | 10/2015 |
| WO | 2010/103936 | A1 | 9/2010 |
| WO | 2020/158063 | A1 | 8/2020 |

OTHER PUBLICATIONS

Jul. 22, 2023 Office Action issued in Chinese Patent Application No. 202180043647.0.

Sep. 21, 2021 International Search Report issued in International Patent Application No. PCT/JP2021/024846.

* cited by examiner

GALVANIZED STEEL SHEET, MEMBER, AND METHOD FOR PRODUCING THEM

TECHNICAL FIELD

This application relates to a high-strength galvanized steel sheet or member with good collision characteristics and a method for producing the steel sheet or member. A galvanized steel sheet according to the application can be suitably used mainly as an automotive steel sheet.

BACKGROUND

To reduce $CO_2$ emissions from the perspective of global environmental conservation, it is always important in the automobile industry to reduce the weights of automobile bodies while maintaining their strength and improve mileage. To reduce the weights of automobile bodies while maintaining their strength, it is effective to increase strength of steel sheets used as materials for automotive parts and thereby reduce the thickness of the steel sheets. On the other hand, automotive parts made of steel sheets are required to ensure the safety of occupants in the automobile in case of a collision. Thus, high-strength galvanized steel sheets used as materials for automotive parts are required to have good collision characteristics as well as desired strength.

In recent years, high-strength galvanized steel sheets with a tensile strength TS of 980 MPa or more have been increasingly applied to automobile bodies. From the perspective of collision characteristics, automotive parts are broadly divided into non-deformable members, such as pillars and bumpers, and energy-absorbing members, such as side members. These members should have collision characteristics necessary to ensure the safety of occupants in a moving automobile in case of a collision. Strength of non-deformable members have been increased, and high-strength galvanized steel sheets with a tensile strength (hereinafter also referred to simply as TS) of 980 MPa or more have already been practically used. However, energy-absorbing members have not been significantly strengthened, and the strength level of practical steel is a TS of approximately 590 MPa or less. One reason for achievement of little strengthening of energy-absorbing members is that in case of a collision a high-strength galvanized steel sheet tends to cause a member fracture originating from a portion subjected to primary processing of forming and cannot consistently absorb collision energy. Thus, there is room for preventing member fracture in case of a collision, consistently exhibiting high energy absorption to ensure safety in case of a collision, and reducing weight to contribute to environmental conservation. Thus, a high-strength galvanized steel sheet with good collision characteristics and with a TS of 590 MPa or more should be applied to an energy-absorbing member.

To address such a need, for example, Patent Literature 1 discloses a technique related to an ultra-high-strength galvanized steel sheet with high formability and impact resistance and with a TS of 1200 MPa. Patent Literature 2 discloses a technique related to a high-strength galvanized steel sheet with a maximum tensile strength of 780 MPa or more applicable to an impact-absorbing member in case of a collision.

CITATION LIST

Patent Literature

PTL 1: Japanese Unexamined Patent Application Publication No. 2012-31462

PTL 2: Japanese Unexamined Patent Application Publication No. 2015-175061

SUMMARY

Technical Problem

Although collision characteristics are examined in Patent Literature 1, impact resistance is examined on the assumption that a member is not broken in case of a collision, and collision characteristics are not examined from the perspective of member fracture resistance.

In Patent Literature 2, a dynamic axial crushing test with a falling weight is performed on a hat-shaped member to evaluate cracking and fracture resistance at a TS of more than 780 MPa. However, rating cracking after crushing cannot evaluate the process from the initiation of a crack during the crushing to the fracture, which is important for collision characteristics. This is because, if a crack occurs early in the process of crushing, even a small crack that does not passes through the sheet may reduce absorbing energy. Furthermore, if a crack occurs in the later stage in the process of crushing, even a large crack that passes through the sheet may have little effect on absorbing energy. Thus, only rating cracking after crushing is probably insufficient for the evaluation of fracture resistance.

In view of such situations, it is an object of the disclosure to provide a galvanized steel sheet or member with a tensile strength (TS) of 590 MPa or more and with good collision characteristics suitable for an energy-absorbing member of an automobile and a method for producing the galvanized steel sheet or member.

Solution to Problem

As a result of extensive studies to solve the above problems, the inventors have found the following.

A galvanized steel sheet includes: a steel sheet having a chemical composition satisfying an equivalent carbon content Ceq of 0.35% or more and less than 0.60%, and a steel microstructure with an area fraction of ferrite: 40% to 80%, tempered martensite and bainite: 15% to 55% in total, retained austenite: 3% to 20%, fresh martensite: 10% or less, and ferrite, tempered martensite, bainite, retained austenite, and fresh martensite: 90% or more in total; and a galvanized layer on a surface of the steel sheet. In the galvanized steel sheet, the retained austenite has a solute C content of 0.6% or more by mass, retained austenite grains with an aspect ratio of less than 2.0 constitute 50% or more of all retained austenite grains, and in specified 90-degree bending, an L cross section in a 0- to 50-µm region from a surface of the steel sheet on a compression side has a number density of voids of $1000/mm^2$ or less. It has been found that these can provide a high-strength steel sheet with good collision characteristics.

The disclosed embodiments have been accomplished on the basis of these findings, and the summary of the embodiments is described below.

[1] A galvanized steel sheet including:
  a steel sheet having
    a chemical composition satisfying an equivalent carbon content Ceq of 0.35% or more and less than 0.60%, and
    a steel microstructure with an area fraction of ferrite: 40% to 80%, tempered martensite and bainite: 15% to 55% in total, retained austenite: 3% to 20%, fresh martensite: 10% or less, and ferrite, tempered martensite, bainite, retained austenite, and fresh martensite: 90% or more in total; and a galvanized layer on a surface of the steel sheet,
wherein the retained austenite has a solute C content of 0.6% or more by mass, retained austenite grains with an aspect ratio of less than 2.0 constitute 50% or more of all retained austenite grains, in 90-degree bending at a curvature radius/thickness ratio of 4.2 in a rolling (L) direction with respect to an axis extending in a width (C) direction, an L cross section in a 0- to 50-µm region from a surface of the steel sheet on a compression side has a number density of voids of 1000/$mm^2$ or less, and the galvanized steel sheet has a tensile strength of 590 MPa or more.

[2] The galvanized steel sheet according to [1], wherein the chemical composition contains, on a mass percent basis,
C: 0.03% to 0.20%,
Si: 0.10% to 2.00%,
Mn: 0.5% to 2.5%,
P: 0.05% or less,
S: 0.05% or less,
Sol. Al: 0.005% to 0.100%, and
N: 0.010% or less, a remainder being composed of Fe and incidental impurities.

[3] The galvanized steel sheet according to [2], wherein the chemical composition further contains, on a mass percent basis,
at least one selected from
Cr: 1.0% or less,
Mo: 0.5% or less,
V: 0.5% or less,
Ti: 0.5% or less,
Nb: 0.5% or less,
B: 0.005% or less,
Ni: 1.0% or less,
Cu: 1.0% or less,
Sb: 1.0% or less,
Sn: 1.0% or less,
Ca: 0.005% or less, and
REM: 0.005% or less.

[4] The galvanized steel sheet according to any one of [1] to [3], wherein the galvanized layer is an electrogalvanized layer, a hot-dip galvanized layer, or a hot-dip galvannealed layer.

[5] A member produced by performing at least one of forming and welding on the galvanized steel sheet according to any one of [1] to [4].

[6] A method for producing a galvanized steel sheet including:

a hot-rolling step of hot-rolling a steel slab satisfying an equivalent carbon content Ceq of 0.35% or more and less than 0.60% and having the chemical composition according to [2] or [3] at a finish rolling temperature in the range of 850° C. to 950° C. and coiling the resulting hot-rolled steel sheet at a coiling temperature of 600° C. or less;

a cold-rolling step of cold-rolling the hot-rolled steel sheet after the hot-rolling step at a rolling reduction of more than 20%;

an annealing step of heating the cold-rolled steel sheet after the cold-rolling step to an annealing temperature in the range of 720° C. to 860° C. and holding the steel sheet for 30 seconds or more;

a coating step of cooling the steel sheet to the temperature range of 300° C. to 600° C. after the annealing step, holding the steel sheet in the temperature range for 10 to 300 seconds, and then galvanizing a surface of the steel sheet;

a quenching and tempering step of cooling the steel sheet to a finish cooling temperature in the range of (Ms−250° C.) to (Ms−50° C.) after the coating step and then holding the steel sheet at a tempering temperature in the range of 300° C. to 500° C. for 20 to 500 seconds; and a cooling step of cooling the steel sheet from the tempering temperature to 50° C. at an average cooling rate of 20° C./s or more after the quenching and tempering step. [7] The method for producing a galvanized steel sheet according to [6], wherein the galvanizing is electrogalvanizing, hot-dip galvanizing, or hot-dip galvannealing on a surface of the steel sheet.

[8] A method for producing a member, including the step of performing at least one of forming and welding on a galvanized steel sheet produced by the method for producing a galvanized steel sheet according to [6] or [7].

Advantageous Effects of Invention

The disclosed embodiments can provide a galvanized steel sheet with a tensile strength (TS) of 590 MPa or more and with good collision characteristics. A member produced by performing forming, welding, or the like on a galvanized steel sheet according to the disclosed embodiments can be suitably used as an energy-absorbing member used in the automotive field.

DETAILED DESCRIPTION

Figure 1:
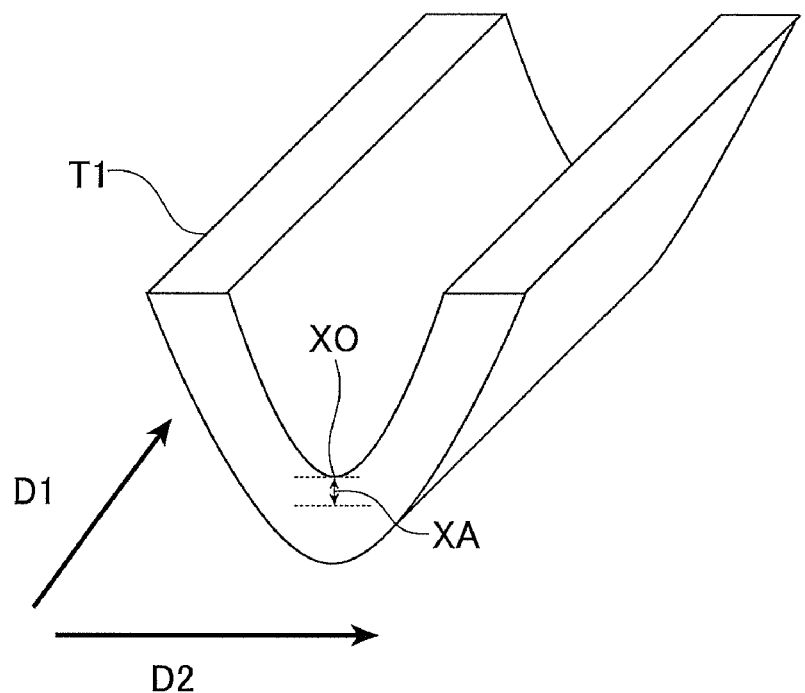
FIG. 1 is an explanatory view of a steel sheet after 90-degree bending (primary bending).

Embodiments are described in detail below.

A galvanized steel sheet according to the disclosed embodiments includes: a steel sheet having a chemical composition satisfying an equivalent carbon content Ceq of 0.35% or more and less than 0.60%, and a steel microstructure with an area fraction of ferrite: 40% to 80%, tempered martensite and bainite: 15% to 55% in total, retained austenite: 3% to 20%, fresh martensite: 10% or less, and ferrite, tempered martensite, bainite, retained austenite, and fresh martensite: 90% or more in total; and a galvanized layer on a surface of the steel sheet.

Equivalent Carbon Content Ceq: 0.35% or More and Less than 0.60%

The equivalent carbon content Ceq refers to the effects of elements other than C converted into the C content as a measure of the strength of steel. Setting the equivalent carbon content Ceq to 0.35% or more and less than 0.60% allows the area fraction of each metallic microstructure, such as ferrite, described later to be controlled within the scope of the disclosed embodiments. Setting the equivalent carbon content Ceq to 0.35% or more, preferably 0.40% or more, can provide the strength of the disclosed embodiments. The effect of improving collision characteristics in the disclosed embodiments cannot be produced at an equivalent carbon content Ceq of 0.60% or more. Thus, the equivalent carbon content Ceq is less than 0.60%, preferably 0.55% or less.

The equivalent carbon content Ceq can be determined using the following formula.

$$\text{Equivalent carbon content Ceq} = [\text{Co}] + ([\text{Si \%}]/24) + ([\text{Mn \%}]/6) + ([\text{Ni \%}]/40) + ([\text{Cr \%}]/5) + ([\text{Mo \%}]/4) + ([\text{V \%}]/14)$$

The [element symbol %] in the formula represents the element content (% by mass) and is 0 for an element not contained.

Area Fraction of Ferrite: 40% to 80%

An area fraction of ferrite of less than 40% may result in an excessive volume fraction of tempered martensite and poor collision characteristics. Thus, the area fraction of ferrite is 40% or more, preferably 45% or more. On the other hand, an area fraction of ferrite of more than 80% may result in an excessive volume fraction of ferrite and a lower TS. Thus, the area fraction of ferrite is 80% or less, preferably 75% or less.

Total Area Fraction of Tempered Martensite and Bainite: 15% to 55%

Tempered martensite and bainite are effective in reducing member fracture in collision deformation, improving absorbing energy, and increasing strength. A total area fraction of tempered martensite and bainite of less than 15% may result in a lower TS. Thus, the total area fraction is 15% or more, preferably 20% or more, more preferably 22% or more, still more preferably 24% or more. A total area fraction of tempered martensite and bainite of more than 55% may result in poor collision characteristics. Thus, the total area fraction is 55% or less, preferably 50% or less, more preferably 48% or less, still more preferably 46% or less.

Area Fraction of Retained Austenite: 3% to 20%

Retained austenite is effective in retarding cracking in case of a collision and improving collision characteristics. The mechanism is not clear but may be as follows: retained austenite is work-hardened in collision deformation, increases the curvature radius in bending deformation, and disperses strain in a bent portion. The dispersion of strain reduces stress concentration in a void forming portion in the primary processing and consequently improves collision characteristics. Such effects cannot be produced at an area fraction of retained austenite of less than 3%. Thus, the area fraction of retained austenite is 3% or more, preferably 5% or more, more preferably 7% or more. On the other hand, an area fraction of retained austenite of more than 20% may result in lower fracture resistance in case of a collision due to fresh martensite formed by deformation-induced transformation. Thus, the area fraction of retained austenite is 20% or less, preferably 15% or less, more preferably 10% or less.

Fresh Martensite: 10% or Less

Fresh martensite is effective for high strengthening. However, a void is likely to be formed at a grain boundary with a soft phase, and an area fraction of fresh martensite of more than 10% may result in poor collision characteristics. Thus, the area fraction of fresh martensite is 10% or less, preferably 5% or less. The lower limit is preferably, but not limited to, 1% or more, more preferably 2% or more, to ensure strength.

Total area fraction of ferrite, tempered martensite, bainite, retained austenite, and fresh martensite: 90% or more A total area fraction of ferrite, tempered martensite, bainite, retained austenite, and fresh martensite of less than 90% results in an increased area fraction of a phase other than these phases and makes it difficult to satisfy both the strength and collision characteristics. The other phase is, for example, pearlite or cementite, and an increase in these phases may cause a starting point of void formation in collision deformation and impair collision characteristics. An increase in the area fraction of pearlite or cementite may result in a decrease in strength. A total area fraction of 90% or more results in high strength and good collision characteristics regardless of the type or area fraction of the residual phase(s). The total area fraction is preferably 93% or more. The remaining microstructures may be pearlite and cementite, and the total area fraction of the remaining microstructures is 10% or less. The total area fraction of the remaining microstructures is preferably 7% or less.

The area fraction of each microstructure refers to the ratio of the area of each phase to the observed area. The area fraction of each microstructure is measured in the following way. A thickness cross section of a steel sheet cut at a right angle to the rolling direction is polished and etched in 3% by volume nital and is photographed at a quarter thickness position with a scanning electron microscope (SEM) at a magnification of 1500 times in three visual fields. The area fraction of each microstructure is determined from the captured image data using Image-Pro available from Media Cybernetics. The area fraction of each microstructure in the disclosed embodiments is the average area fraction of the three visual fields. In the image data, ferrite can be distinguished as black, bainite as black including island-like retained austenite or gray including carbides with the same orientation, tempered martensite as light gray including fine carbides with different orientations, and retained austenite as white. Fresh martensite is also white, and fresh martensite and retained austenite are difficult to be distinguished in SEM images. Thus, the area fraction of fresh martensite is determined by subtracting the area fraction of retained austenite determined by a method described later from the total area fraction of fresh martensite and retained austenite.

In the disclosed embodiments, an X-ray diffraction intensity was measured to determine the volume fraction of retained austenite, and the volume fraction was regarded as the area fraction of retained austenite. The volume fraction of retained austenite is determined as the ratio of the integrated X-ray diffraction intensity of (200), (220), and (311) planes in fcc iron to the integrated X-ray diffraction intensity of (200), (211), and (220) planes in bcc iron at a quarter thickness.

Solute C Content of Retained Austenite: 0.6% or More by Mass

A solute C content of retained austenite of less than 0.6% by mass may result in transformation of a large amount of retained austenite into martensite in the initial low strain region in a collision deformation process and may result in lower fracture resistance in case of a collision due to fresh martensite formed by deformation-induced transformation in the subsequent deformation process. Thus, the solute C content of retained austenite is 0.6% or more by mass, more preferably 0.7% or more by mass. The upper limit of the solute C content of retained austenite is preferably, but not limited to, 1.5% or less by mass because excessive concentration of C in non-transformed austenite may result in decomposition of the non-transformed austenite and a decrease in retained austenite.

The solute C content of retained austenite can be determined by analyzing the C content of retained austenite grains at a quarter thickness position in a cross section of a steel sheet cut at a right angle to the rolling direction using a field-emission electron probe microanalyzer (FE-SPMA) and averaging the C content of each retained austenite grain in the analysis result.

Ratio of retained austenite grains with an aspect ratio of less than 2.0 to all retained austenite grains: 50% or more When the ratio of retained austenite grains with an aspect ratio of less than 2.0 to all retained austenite grains is less than 50%, the collision characteristics may be deteriorated. The reason is not clear but may be as follows: retained austenite improves collision characteristics by work hardening and by dispersing strain in a bending deformation portion, but fresh martensite formed by deformation-induced transformation in the deformation process tends to be a starting point of void formation. A void formed at an interface of deformation-induced martensite with a high aspect ratio of retained austenite is rapidly coarsened along the interface and promotes the propagation of a crack. Thus, to reduce the propagation of a crack and utilize the strain dispersion ability of retained austenite, the ratio of retained austenite grains with an aspect ratio of less than 2.0 to all retained austenite grains is 50% or more. The ratio is more preferably 60% or more. A higher ratio is preferred, and therefore the upper limit is not particularly limited.

The aspect ratio of retained austenite is measured in the following way. After a thickness cross section of a steel sheet cut at a right angle to the rolling direction is polished, the surface is smoothed by buffing with a colloidal silica solution and is etched with 0.1% by volume nital. This reduces the unevenness of the sample surface as much as possible and completely removes a work affected layer. Next, a high-resolution crystal orientation analysis is performed at a quarter thickness position by an electron beam backscatter diffraction (SEM-EBSD) method. The data are analyzed using OIM Analysis available from TSL. FCC iron is defined as retained austenite, and the major axis/minor axis is defined as an aspect ratio. (The number of retained austenite grains with an aspect ratio of less than 2.0)/(the number of all retained austenite grains) is measured in three visual fields. The average measured value in the three visual fields is taken as a ratio of retained austenite grains with an aspect ratio of less than 2.0 to all retained austenite grains.

The number density of voids in an L cross section in a 0- to 50-µm region from a surface of a steel sheet on a compression side in 90-degree bending at a curvature radius/thickness ratio of 4.2 in a rolling (L) direction with respect to an axis extending in a width (C) direction: 1000/mm$^2$ or less A galvanized steel sheet according to the disclosed embodiments has good collision characteristics when the number density of voids is 1000/mm$^2$ or less. The mechanism is not clear but may be as follows: a fracture in case of a collision responsible for deterioration of collision characteristics starts from the formation and propagation of a crack. It is thought that a crack tends to occur due to lower work hardening ability and the formation and linking of voids in a region with a large hardness difference. Furthermore, in a collision of an actual member, a portion subjected to the primary processing deforms so as to be bent back in a direction perpendicular to the primary processing. A void formed in a region with a large hardness difference subjected to the primary processing concentrates stress around the void, promotes the formation and propagation of a crack, and finally causes a fracture. Thus, tempered martensite and bainite are used to reduce the region with a large hardness difference, and, if necessary, retained austenite is used to reduce stress concentration in a primary processed portion during deformation. This can reduce the formation and propagation of a void in the primary processed portion and member fracture associated therewith and achieve high fracture resistance. Thus, to produce these effects, the number density of z voids is 1000/mm$^2$ or less. The lower limit of the number density of voids is not particularly limited because fracture in axial crushing decreases with decreasing number density of voids.

A desired number density of voids can be achieved by controlling holding before quenching and the cooling rate after annealing described later and by performing coating treatment before a quenching and tempering step. Bainite formed by holding before quenching is tempered and softened in a coating step and a tempering step to reduce void formation at an interface with soft ferrite. Furthermore, the cooling rate after tempering is increased to prevent bainite formed in the tempering step from softening due to tempering while cooling, and coating treatment before the tempering step prevents softening due to tempering during the coating treatment. These prevent void formation at an interface with hard fresh martensite.

The number density of voids (/mm$^2$), as used herein, refers to the number of voids per mm$^2$ in an L cross section in a 0- to 50-µm region from a surface of a steel sheet on a compression side in 90-degree bending at a curvature radius/thickness ratio of 4.2 in a rolling (L) direction with respect to an axis extending in a width (C) direction.

Any processing method that satisfies primary bending conditions may be used. The primary bending method may be bending by a V-block method or bending by drawing.

The number density of voids is measured by the following method. A galvanized steel sheet is subjected to 90-degree bending at a curvature radius/thickness ratio of 4.2 in the rolling (L) direction with respect to an axis extending in the width (C) direction. The thickness cross section is then polished, and an L cross section in a 0- to 50-µm region from a surface of the steel sheet on the compression side is observed. The L cross section is photographed with a scanning electron microscope (SEM) at a magnification of 1500 times in three visual fields, and the number density of voids is determined from the captured image data using Image-Pro available from Media Cybernetics. The average number density in the three visual fields is defined as the number density of voids. Voids are darker black than ferrite and can be clearly distinguished from microstructures.

The measurement position of a void after bending in the rolling direction is in a region including a corner X0 formed by the bending and extending in the width (C) direction (see the reference letter D1 in FIG. 1). More specifically, in a region that becomes the lowest portion in the width direction and in a direction perpendicular to the rolling direction (a pressing direction of a pressing portion, such as a punch) by bending, the number density of voids is measured in a 0- to 50-µm region in the thickness direction (see the reference letter XA in FIG. 1).

In the disclosed embodiments, performing 90-degree bending in the rolling (L) direction with respect to an axis extending in the width (C) direction refers to bending a steel sheet by pressing a surface of the steel sheet in a direction perpendicular to the width direction and the rolling direction (see the reference letters D1 and D2 in FIG. 1) such that the distance between both end portions is shortened when the steel sheet is viewed in the width (C) direction (see the reference letter D1 in FIG. 1) (when a steel sheet is viewed in the width direction (in a vertical cross-sectional view in the width direction)) and such that the angle of the lowest V-shaped portion in the L cross section is 90 degrees.

A surface of a steel sheet on the compression side refers to a surface of the steel sheet to be pressed as described above (a surface of the steel sheet in contact with a pressing portion, such as a punch).

An L cross section after bending refers to a cross section that is formed by cutting parallel to the direction of deformation caused by bending and perpendicular to a surface of a steel sheet and that is perpendicular to the width direction.

A galvanized steel sheet according to the disclosed embodiments has a galvanized layer on a surface of the steel sheet. The galvanized layer is, for example, an electrogalvanized layer, a hot-dip galvanized layer, or a hot-dip galvannealed layer.

A galvanized steel sheet according to the disclosed embodiments has a tensile strength (TS) of 590 MPa or more. The term "high strength", as used herein, refers to a tensile strength (TS) of 590 MPa or more. The upper limit of tensile strength (TS) is preferably, but not limited to, less than 980 MPa in terms of the balance with other characteristics. The tensile strength (TS) is determined by taking a JIS No. 5 test piece for tensile test (JIS Z 2201) from a steel sheet in a direction perpendicular to the rolling direction and performing a tensile test at a strain rate of $10^3$/s in accordance with JIS Z 2241 (2011).

A galvanized steel sheet according to the disclosed embodiments preferably has a thickness in the range of 0.2 to 3.2 mm in order to effectively achieve the advantages of the embodiment.

A galvanized steel sheet according to the disclosed embodiments has good collision characteristics. The term "good collision characteristics", as used herein, refers to high fracture resistance and absorbing energy. The term "good fracture resistance", as used herein, refers to an average stroke ΔS of 30 mm or more at the maximum load in a bending-orthogonal bending test described later. The term "good collision characteristics", as used herein, refers to an average area $F_{ave}$ of 35000 N or more at a stroke in the range of 0 to 100 mm in a crushing stroke-load graph in an axial crushing test described later.

The bending-orthogonal bending test is performed as described below.

Figure 2:
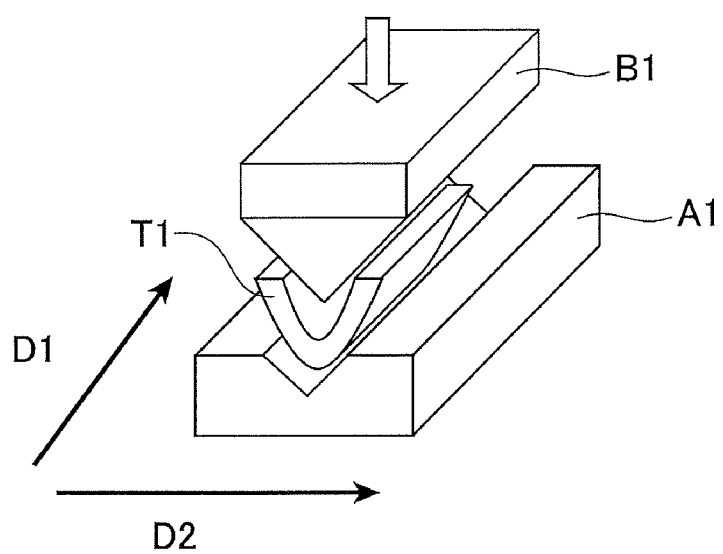
FIG. 2 is an explanatory view of the 90-degree bending (primary bending) in a bending-orthogonal bending test in Examples.
Figure 3:
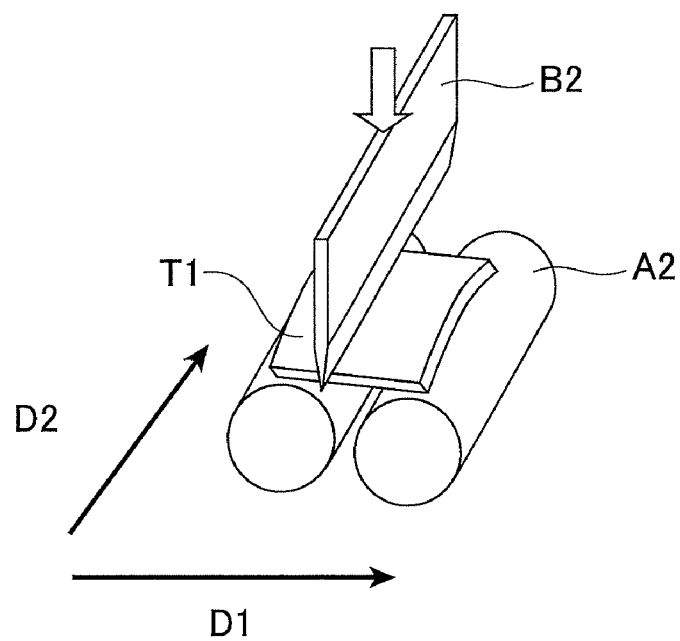
FIG. 3 is an explanatory view of orthogonal bending (secondary bending) in a bending-orthogonal bending test in Examples.

First, a steel sheet is subjected to 90-degree bending (primary bending) at a curvature radius/thickness ratio of 4.2 in the rolling (L) direction with respect to an axis extending in the width (C) direction to prepare a test specimen. In the 90-degree bending (primary bending), as illustrated in FIG. 2, a punch B1 is pressed against a steel sheet on a die A1 with a V-groove to prepare a test specimen T1. Next, as illustrated in FIG. 3, the test specimen T1 on support rolls A2 was subjected to orthogonal bending (secondary bending) by pressing a punch B2 against the test specimen T1 in the direction perpendicular to the rolling direction. In FIGS. 2 and 3, D1 denotes the width (C) direction, and D2 denotes the rolling (L) direction.

Figure 4:
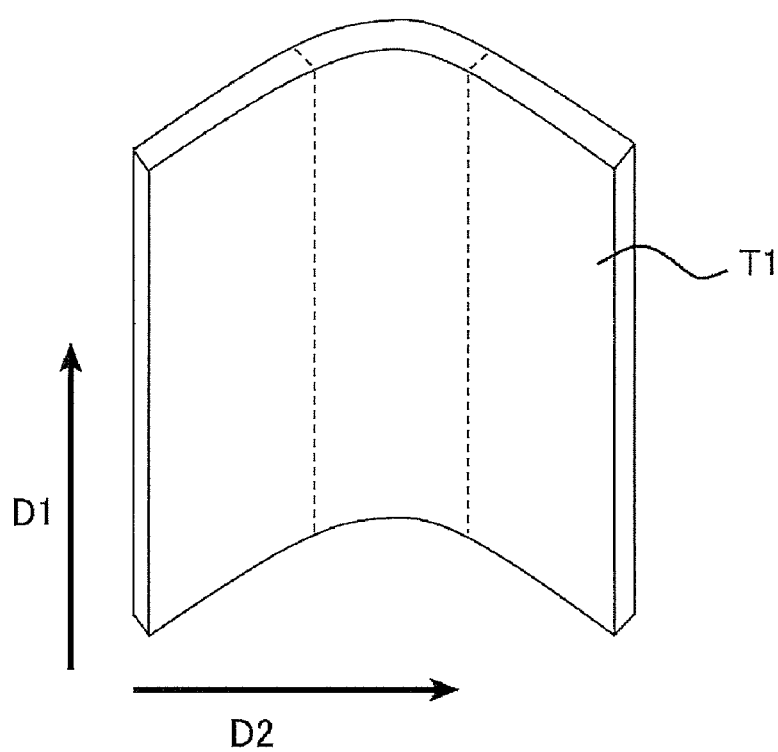
FIG. 4 is a perspective view of a test specimen subjected to the 90-degree bending (primary bending).
Figure 5:
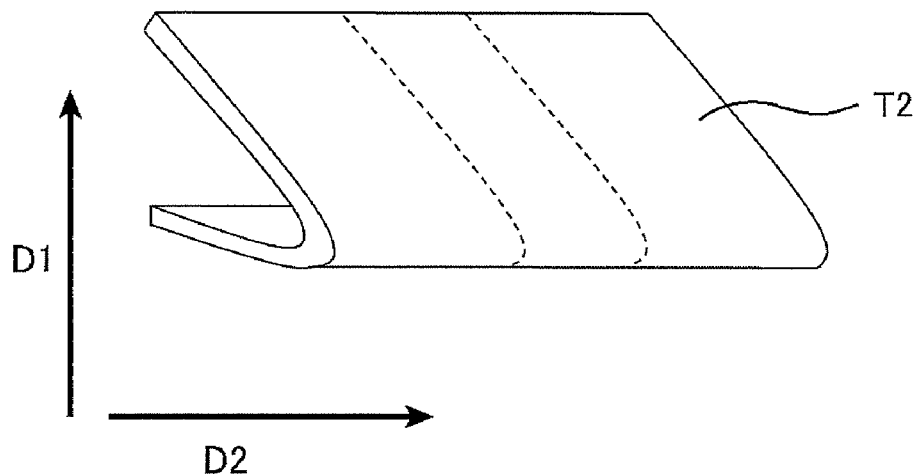
FIG. 5 is a perspective view of a test specimen subjected to the orthogonal bending (secondary bending).

FIG. 4 illustrates the test specimen T1 after the steel sheet is subjected to the 90-degree bending (primary bending). FIG. 5 illustrates the test specimen T2 after the test specimen T1 is subjected to the orthogonal bending (secondary bending). The positions indicated by the broken lines on the test specimen T2 in FIG. 5 correspond to the positions indicated by the broken lines on the test specimen T1 in FIG. 4 before the orthogonal bending.

The conditions for the orthogonal bending are as follows:

[Orthogonal Bending Conditions]
Test method: roll support, punch pressing
Roll diameter: ϕ30 mm
Punch tip R: 0.4 mm
Distance between rolls: (sheet thickness×2)+0.5 mm
Stroke speed: 20 mm/min
Test specimen size: 60 mm×60 mm
Bending direction: a direction perpendicular to the rolling direction The stroke at the maximum load is determined in a stroke-load curve of the orthogonal bending. The average stroke ΔS at the maximum load is determined by performing the bending-orthogonal bending test three times.

Figure 6:
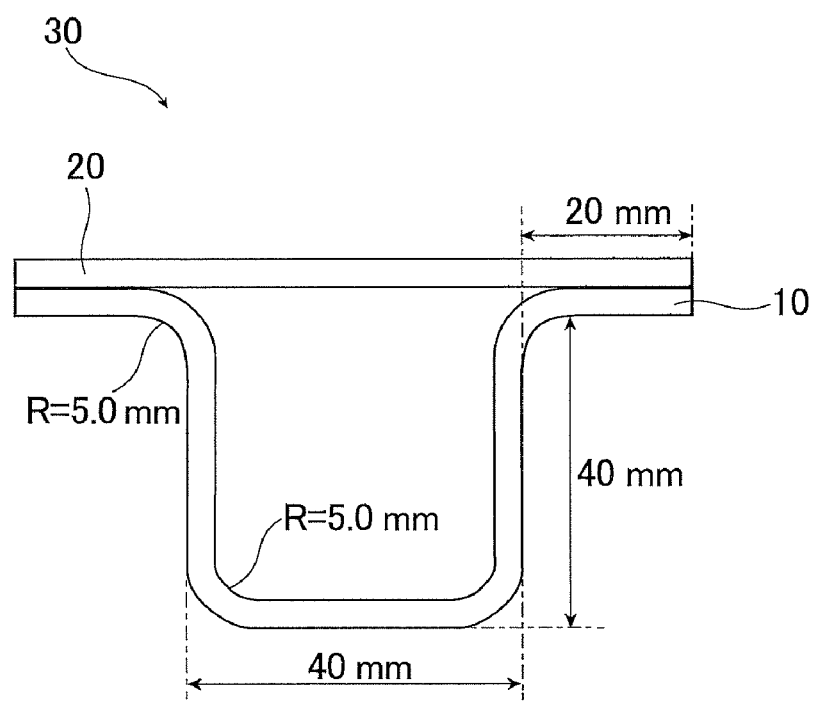
FIG. 6 is a front view of a test member composed of a hat-shaped member and a steel sheet spot welded together for an axial crushing test in Examples.
Figure 7:
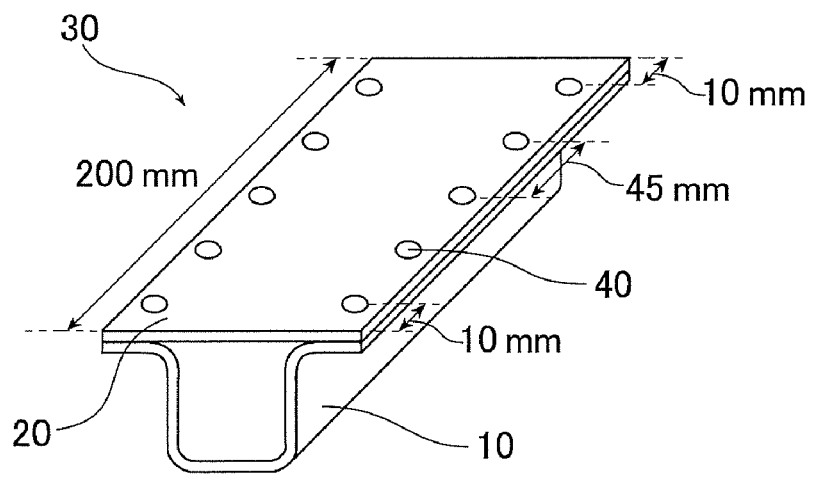
FIG. 7 is a perspective view of the test member illustrated in FIG. 6.
Figure 8:
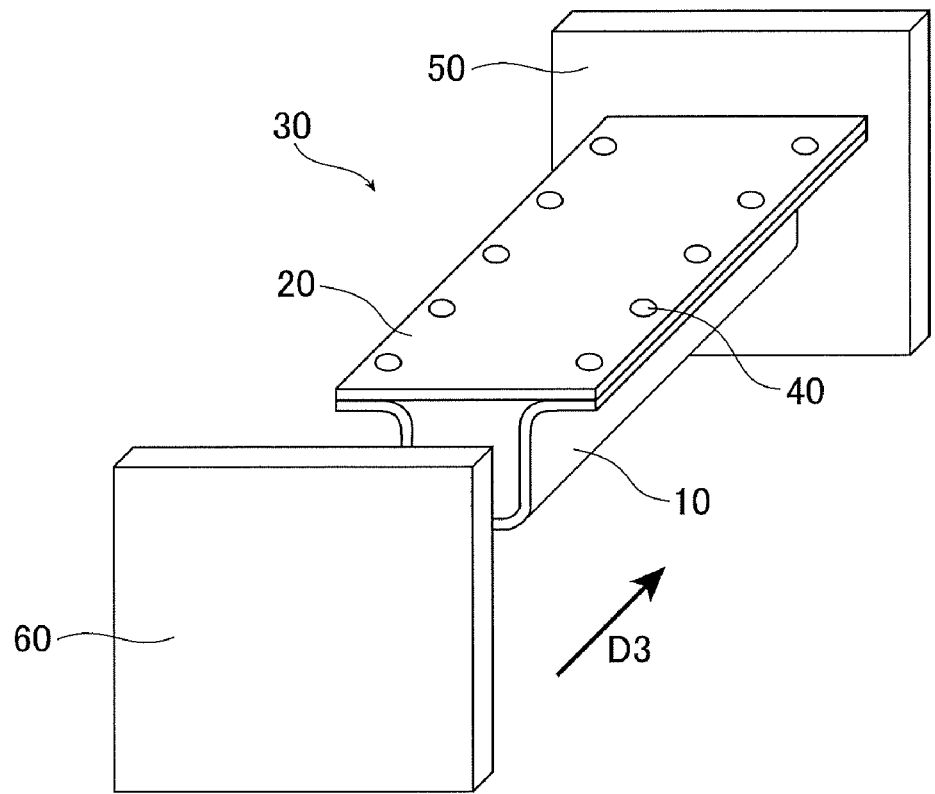
FIG. 8 is a schematic explanatory view of an axial crushing test in Examples.

The axial crushing test is performed as described below. Axial crushing tests were performed on galvanized steel sheets 1.2 mm in thickness in consideration of the effects of the thickness. A galvanized steel sheet produced through the production steps described above is cut and formed (bent) to a depth of 40 mm using a die with a punch shoulder radius of 5.0 mm and a die shoulder radius of 5.0 mm to produce a hat-shaped member 10 illustrated in FIGS. 6 and 7. The galvanized steel sheet used as the material of the hat-shaped member is separately cut into a size of 200 mm×80 mm. Next, a galvanized steel sheet 20 thus cut out and the hat-shaped member 10 were spot welded to produce a test member 30 as illustrated in FIGS. 6 and 7. FIG. 6 is a front view of the test member 30 produced by spot-welding the hat-shaped member 10 and the galvanized steel sheet 20. FIG. 7 is a perspective view of the test member 30. As illustrated in FIG. 7, spot welds 40 are positioned such that the distance between an end portion of the galvanized steel sheet and a weld is 10 mm and the distance between the welds is 45 mm. Next, as illustrated in FIG. 8, the test member 30 is joined to a base plate 50 by TIG welding to prepare a sample for the axial crushing test. Next, the prepared axial crushing test sample is collided with an impactor 60 at a constant impact speed of 10 m/s to crush the axial crushing test sample by 100 mm. As illustrated in FIG. 8, the crushing direction D3 is parallel to the longitudinal direction of the test member 30. The area in a crushing stroke-load graph at a stroke in the range of 0 to 100 mm is determined, and the average area of the test performed three times is taken as absorbed energy ($F_{ave}$).

Next, a preferred chemical composition of a steel sheet constituting a galvanized steel sheet is described. Unless otherwise specified, "%" representing the component element content refers to "% by mass".

C: 0.03% to 0.20%

C facilitates the formation of a phase other than ferrite and forms an alloy compound with Nb, Ti, or the like. C is therefore an element necessary for strength improvement. Desired strength may not be achieved at a C content of less than 0.03% even if the production conditions are optimized. Thus, the C content is preferably 0.03% or more, more preferably 0.05% or more. At a C content of more than 0.20%, however, the strength of martensite increases excessively, and the collision characteristics of the disclosed embodiments may not be achieved even if the production conditions are optimized. Thus, the C content is preferably 0.20% or less, more preferably 0.18% or less.

Si: 0.10% to 2.00%

Si reduces carbide formation, and therefore retained austenite is formed. Si is also a solid-solution strengthening element and contributes to an improvement in the balance between strength and ductility. To produce this effect, the Si content is preferably 0.10% or more, more preferably 0.50% or more. On the other hand, a Si content of more than 2.00% may result in lower deposition or adhesion in galvanization and poor surface quality. Thus, the Si content is preferably 2.00% or less, more preferably 1.50% or less.

Mn: 0.5% to 2.5%

Mn is a martensite-forming element and is also a solid-solution strengthening element.

Mn contributes to the stabilization of retained austenite. To produce these effects, the Mn content is preferably 0.5% or more. The Mn content is more preferably 1.0% or more. On the other hand, a Mn content of more than 2.5% may result in an excessively increased volume fraction of retained austenite and poor collision characteristics. Thus, the Mn content is preferably 2.5% or less, more preferably 2.0% or less.

P: 0.05% or Less

P is an element effective in strengthening steel. However, a P content of more than 0.05% may result in a much lower alloying rate. An excessively high P content of more than 0.05% may result in embrittlement due to grain boundary segregation and result in lower fracture resistance in case of a collision even with a steel microstructure of the disclosed embodiments. Thus, the P content is preferably 0.05% or less, more preferably 0.01% or less. Although the P content may have any lower limit, the lower limit industrially applicable at present is 0.002%, the P content is preferably 0.002% or more.

S: 0.05% or Less

S forms an inclusion MnS or the like, causes a crack in a weld along the metal flow, and may impair collision characteristics even with a steel microstructure of the disclosed embodiments. Thus, the S content is preferably as low as possible but is preferably 0.05% or less in terms of production costs. The S content is more preferably 0.01% or less. Although the S content may have any lower limit, the lower limit industrially applicable at present is 0.0002%, the S content is preferably 0.0002% or more.

Sol. Al: 0.005% to 0.100%

Al acts as a deoxidizing agent and is also a solid-solution strengthening element. A Sol. Al content of less than 0.005% may be insufficient for these effects and may result in lower strength even with a steel microstructure of the disclosed embodiments. Thus, the Sol. Al content is preferably 0.005% or more. On the other hand, a Sol. Al content of more than 0.100% results in lower slab quality in steelmaking. Thus, the Sol. Al content is preferably 0.100% or less, more preferably 0.050% or less.

N: 0.010% or Less

N forms a coarse nitride and therefore may act as a starting point of void formation in collision deformation and impair collision characteristics. Thus, the N content is preferably as low as possible, but from the perspective of production costs, the N content is preferably 0.010% or less, more preferably 0.006% or less. Although the N content may have any lower limit, the lower limit industrially applicable at present is 0.0003%, the N content is preferably 0.0003% or more.

A chemical composition of a steel sheet according to the disclosed embodiments contains these component elements as base components and the remainder composed of iron (Fe) and incidental impurities. A steel sheet according to the disclosed embodiments preferably has a chemical composition that contains the base components and the remainder composed of iron (Fe) and incidental impurities.

A steel sheet according to the disclosed embodiments may contain the following components (optional elements) depending on desired characteristics.

At least one selected from Cr: 1.0% or less, Mo: 0.5% or less, V: 0.5% or less, Ti: 0.5% or less, Nb: 0.5% or less, B: 0.005% or less, Ni: 1.0% or less, Cu: 1.0% or less, Sb: 1.0% or less, Sn: 1.0% or less, Ca: 0.005% or less, and REM: 0.005% or less Cr, Mo, and V are elements that are effective in improving hardenability and strengthening steel. However, the excessive addition of more than 1.0% of Cr, more than 0.5% of Mo, or more than 0.5% of V has saturated effects and further increases the raw material cost. This may also excessively increase the second phase fraction and reduce fracture resistance in case of a collision. Thus, when any one of Cr, Mo, and V is contained, the Cr content is preferably 1.0% or less, the Mo content is preferably 0.5% or less, and the V content is preferably 0.5% or less. More preferably, the Cr content is 0.8% or less, the Mo content is 0.4% or less, and the V content is 0.4% or less. The advantages of the disclosed embodiments can be achieved even at a low Cr, Mo, or V content. Thus, the Cr, Mo, or V content may have any lower limit. To more effectively produce the effects of hardenability, the Cr, Mo, or V content is preferably 0.005% or more. More preferably, the Cr, Mo, or V content is 0.01% or more.

Ti and Nb are elements effective for precipitation strengthening of steel. However, a Ti content or a Nb content of more than 0.5% may result in lower fracture resistance in case of a collision. Thus, when either Ti or Nb is contained, the Ti content or the Nb content is preferably 0.5% or less. More preferably, the Ti content or the Nb content is 0.4% or less. The advantages of the disclosed embodiments can be achieved even at a low Ti or Nb content. Thus, the Ti or Nb content may have any lower limit. To more effectively produce the effects of precipitation strengthening of steel, the Ti content or the Nb content is preferably 0.005% or more. More preferably, the Ti content or the Nb content is 0.01% or more.

B may be added as required because B prevents the formation and growth of ferrite from an austenite grain boundary and contributes to an improvement in hardenability. However, a B content of more than 0.005% may result in lower fracture resistance in case of a collision. Thus, when B is contained, the B content is preferably 0.005% or less. More preferably, the B content is 0.004% or less. The advantages of the disclosed embodiments can be achieved even at a low B content. Thus, the B content may have any lower limit. To more effectively produce the effects of improving hardenability, the B content is preferably 0.0003% or more. More preferably, the B content is 0.0005% or more.

Ni and Cu are elements effective in strengthening steel. However, a Ni or Cu content of more than 1.0% may result in lower fracture resistance in case of a collision. Thus, when Ni or Cu is contained, the Ni or Cu content is preferably 1.0% or less. More preferably, the Ni content or the Cu content is 0.9% or less. The advantages of the disclosed embodiments can be achieved even at a low Ni or Cu content. Thus, the Ni or Cu content may have any lower limit. To more effectively produce the effects of strengthening steel, the Ni content or the Cu content is preferably 0.005% or more. More preferably, the Ni content or the Cu content is 0.01% or more.

Sn and Sb may be added as required to reduce nitriding and oxidation of a surface of a steel sheet and decarburization in a region near a surface of a steel sheet. Such prevention of nitriding or oxidation is effective in preventing a decrease in the formation of martensite on a surface of a steel sheet and improving collision characteristics. However, a Sb or Sn content of more than 1.0% may result in poor collision characteristics due to grain boundary embrittlement. Thus, when Sb or Sn is contained, the Sb content or the Sn content is preferably 1.0% or less. More preferably, the Sb content or the Sn content is 0.9% or less. The advantages of the disclosed embodiments can be achieved even at a low Sb or Sn content. Thus, the Sb or Sn content may have any lower limit. To more effectively produce the effects of improving collision characteristics, the Sb content or the Sn content is preferably 0.005% or more. More preferably, the Sb content or the Sn content is 0.01% or more.

Ca and REM are elements effective in improving workability by morphological control of sulfide. However, a Ca or REM content of more than 0.005% may result in adverse effects on the cleanliness of steel and poor characteristics. Thus, when Ca or REM is contained, the Ca or REM content is preferably 0.005% or less. More preferably, the Ca content or the REM content is 0.004% or less. The advantages of the disclosed embodiments can be achieved even at a low Ca or REM content. Thus, the Ca or REM content may have any lower limit. To more effectively produce the effects of improving workability, the Ca or REM content is preferably 0.001% or more. More preferably, the Ca content or the REM content is 0.002% or more.

These optional elements, if contained below the appropriate lower limits described above, are contained as incidental impurities.

Embodiments of a method for producing a galvanized steel sheet are described in detail below. Unless otherwise specified, the temperature at which a steel slab (steel material), a steel sheet, or the like described below is heated or cooled refers to the surface temperature of the steel slab (steel material), the steel sheet, or the like.

A method for producing a galvanized steel sheet according to the disclosed embodiments includes a hot-rolling step of hot-rolling a steel slab with such a chemical composition as described above at a finish rolling temperature in the range of 850° C. to 950° C. and coiling the hot-rolled steel sheet at a coiling temperature of 600° C. or less, a cold-rolling step of cold-rolling the hot-rolled steel sheet after the hot-rolling step at a rolling reduction of more than 20%, an annealing step of heating the cold-rolled steel sheet after the cold-rolling step to an annealing temperature in the range of 720° C. to 860° C. and holding the steel sheet for 30 seconds or more, a coating step of cooling the steel sheet to the temperature range of 300° C. to 600° C. after the annealing step, holding the steel sheet in the temperature range for 10 to 300 seconds, and then galvanizing a surface of the steel sheet, a quenching and tempering step of cooling the steel sheet to a finish cooling temperature in the range of (Ms–250° C.) to (Ms–50° C.) after the coating step and then holding the steel sheet at a tempering temperature in the range of 300° C. to 500° C. for 20 to 500 seconds, and a cooling step of cooling the steel sheet from the tempering temperature to 50° C. at an average cooling rate of 20° C./s or more after the quenching and tempering step. A steel slab for use in a method for producing a steel sheet according to the disclosed embodiments has a chemical composition satisfying an equivalent carbon content Ceq of 0.35% or more and less than 0.60%. The equivalent carbon content Ceq of 0.35% or more and less than 0.60% is an optimum range for producing a steel sheet according to the disclosed embodiments under the production conditions of the embodiment.

First, each condition in the hot-rolling step is described.

Finish rolling temperature: 850° C. to 950° C.

A finish rolling temperature of less than 850° C. may result in ferrite transformation while rolling, locally decreased strength, and low strength even with a microstructure of the disclosed embodiments. Thus, the finish rolling temperature is 850° C. or more, preferably 880° C. or more. On the other hand, a finish rolling temperature of more than 950° C. may result in coarse crystal grains and low strength even with a microstructure of the disclosed embodiments. Thus, the finish rolling temperature is 950° C. or less, preferably 930° C. or less.

Coiling Temperature: 600° C. or Less

A coiling temperature of more than 600° C. may result in coarse carbide in a hot-rolled steel sheet, and such coarse carbide sometimes does not melt completely while soaking in annealing. Thus, the hot-rolled steel sheet may have insufficient collision characteristics. Thus, the coiling temperature is 600° C. or less, preferably 580° C. or less. The coiling temperature may have any lower limit but is preferably 400° C. or more to prevent the formation of a steel sheet in poor shape and an excessively hard steel sheet.

A hot-rolled steel sheet produced in the hot-rolling step is typically subjected to preliminary treatment, such as pickling or degreasing, by a known method and is then cold-rolled if necessary. Conditions for cold-rolling in the cold-rolling step are described below.

Rolling Reduction in Cold-Rolling: More than 20%

When the rolling reduction in the cold-rolling is 20% or less, recrystallization of ferrite is not promoted, unrecrystallized ferrite remains, and a steel microstructure of the disclosed embodiments may not be formed. Thus, the rolling reduction in the cold-rolling is more than 20%, preferably 30% or more.

Next, conditions in the annealing step of annealing a cold-rolled steel sheet produced in the cold-rolling step are described.

Annealing Temperature: 720° C. to 860° C., Holding Time: 30 Seconds or More

An annealing temperature of less than 720° C. results in insufficient austenite formation and excessive ferrite formation. Thus, a steel microstructure of the disclosed embodiments cannot be formed. Thus, the annealing temperature is 720° C. or more, preferably 740° C. or more. 40n the other hand, at an annealing temperature of more than 860° C., the volume fraction of ferrite of the disclosed embodiments cannot be achieved. Thus, the annealing temperature is 860° C. or less, preferably 840° C. or less. A holding time of less than 30 seconds results in insufficient austenite formation and excessive ferrite formation. Thus, a steel microstructure of the disclosed embodiments cannot be formed. Thus, the holding time is 30 seconds or more, preferably 60 seconds or more. The holding time may have any upper limit but is preferably 600 seconds or less in terms of productivity.

Next, conditions in the coating step are described below. The coating step includes cooling the steel sheet to the temperature range of 300° C. to 600° C. after the annealing step, holding the steel sheet in the temperature range for 10 to 300 seconds, and then galvanizing a surface of the steel sheet.

Holding Time in the Temperature Range of 300° C. to 600° C.: 10 to 300 Seconds

After the annealing step, cooling to the temperature range of 300° C. to 600° C. and holding in the temperature range of 300° C. to 600° C. for 10 to 300 seconds are effective in forming bainite. Furthermore, the formation of bainite concentrates C in non-transformed austenite and results in a large amount of retained austenite. These effects cannot be produced in less than 10 seconds. Holding for more than 300 seconds may result in excessive formation of bainite, excessive concentration of C in non-transformed austenite, formation of pearlite, and an insufficient amount of retained austenite. Thus, the holding time is 300 seconds or less, preferably 100 seconds or less.

After the holding, the steel sheet is galvanized. The galvanizing is, for example, electrogalvanizing, hot-dip galvanizing, or hot-dip galvannealing on a surface of the steel sheet. For hot-dip galvanizing of a surface of a steel sheet, for example, a steel sheet produced as described above is preferably immersed in a galvanizing bath at 440° C. to 500° C. to form a hot-dip galvanized layer on the surface of the steel sheet. After the coating treatment, the coating weight is preferably adjusted by gas wiping or the like. A steel sheet after the hot-dip galvanizing treatment may be alloyed. For alloying after the hot-dip galvanizing, it is preferable to hold the temperature in the range of 450° C. to 580° C. for 1 to 60 seconds. For electrogalvanizing a surface of a steel sheet, the conditions for the electrogalvanizing treatment are not particularly limited and may be typical conditions.

Next, conditions in the quenching and tempering step after the coating step are described.

Finish Cooling Temperature: (Ms−250° C.) to (Ms−50° C.)

At a finish cooling temperature of more than (Ms−50° C.), tempered martensite is insufficiently formed, and a steel microstructure of the disclosed embodiments cannot be formed. On the other hand, a finish cooling temperature of less than (Ms−250° C.) may result in excessive tempered martensite and insufficient formation of retained austenite. Thus, the finish cooling temperature ranges from (Ms−250° C.) to (Ms−50° C.), preferably (Ms−200° C.) or more, and preferably (Ms−100° C.) or less. A steel microstructure of the disclosed embodiments can be formed at any cooling rate to the finish cooling temperature that satisfies the above range.

Ms refers to a martensite transformation start temperature and can be determined using the following formula.

$$Ms\ (°\ C.) = 539 - 423 \times \{[C\ \%] \times 100/(100 - [\alpha\ \%\ by\ area])\} 30 \times [Mn\ \%] - 12 \times [Cr\ \%] - 18 \times [Ni\ \%] - 8 \times [Mo\ \%]$$

The [element symbol %] in the formula represents the element content (% by mass) and is 0 for an element not contained. [α % by area] represents the ferrite area fraction (%) after the annealing. The ferrite area fraction after annealing is determined in advance by simulating the heating rate, the annealing temperature, and the holding time for the annealing with a thermodilatometer.

Tempering Temperature: 300° C. to 500° C., Holding Time: 20 to 500 Seconds

At a tempering temperature of less than 300° C., martensite is insufficiently tempered, a void is easily formed at an interface between tempered martensite and ferrite in the primary processing, and collision characteristics are deteriorated. Thus, the tempering temperature is 300° C. or more, preferably 350° C. or more. On the other hand, at a tempering temperature of more than 500° C., martensite and bainite are excessively tempered, a void is easily formed at an interface between fresh martensite, tempered martensite, and bainite in the primary processing, and collision characteristics are deteriorated. Thus, the tempering temperature is 500° C. or less, preferably 450° C. or less. A holding time of less than 20 seconds results in insufficiently tempered martensite and poor collision characteristics. Thus, the holding time is 20 seconds or more, preferably 30 seconds or more. A holding time of more than 500 seconds may result in a decreased ratio of retained austenite with an aspect ratio of less than 2.0. Thus, the upper limit of the holding time is 500 seconds or less, preferably 450 seconds or less.

The cooling step after the quenching and tempering step is described below.

Average Cooling Rate from the Tempering Temperature to 50° C.: 20° C./s or More

At an average cooling rate of less than 20° C./s from the tempering temperature to 50° C., the collision characteristics of the disclosed embodiments cannot be achieved. The reason is not clear but may be as follows: the hardness difference between a soft phase (ferrite) and a hard phase (fresh martensite) must be decreased by an intermediate hardness phase (tempered martensite or bainite) to reduce void formation in a primary processed portion and to improve collision characteristics. The former softens bainite formed before coating treatment and martensite formed while quenching in the tempering step and thereby decreases the hardness difference from the soft phase and reduces the formation of a void. The latter reduces the formation of a void by bainite formed in the tempering step. When softened, bainite formed in the tempering step has a large hardness difference from the hard phase. Thus, coating treatment, which involves exposure to a high temperature, is performed before the tempering step in which bainite is formed, and the cooling rate after the tempering step is increased to reduce the tempering of bainite while cooling. This decreases the hardness difference from the soft phase and reduces the formation of a void. Thus, when the average cooling rate to the room temperature after the tempering step is less than 20° C./s, bainite is tempered while cooling, and the hardness difference from the hard phase increases. Thus, a void is easily formed at the interface in the primary processing, and collision characteristics are deteriorated. The average cooling rate is preferably 25° C./s or more. The upper limit of the average cooling rate is preferably, but not limited to, 70° C./s or less to save energy in cooling facilities.

A galvanized steel sheet according to the disclosed embodiments may be subjected to temper rolling for shape correction, surface roughness adjustment, or the like. In the temper rolling, a temper rolling reduction of more than 0.5% may result in lower bendability due to surface hardening. Thus, the temper rolling reduction is preferably 0.5% or less, more preferably 0.3% or less. It is also possible to apply coating treatment, such as resin or oil coating.

Other conditions of a production method are not particularly limited but are preferably the following conditions.

A slab is preferably produced by continuous casting to prevent macrosegregation and may be produced by ingot casting or thin slab casting. To hot-roll a slab, the slab may be cooled to room temperature and then reheated for hot-rolling. A slab may be hot-rolled in a furnace without cooling to room temperature. An energy-saving process of hot-rolling a slab immediately after lightly conserving heat is also applicable. When a slab is heated, the slab is preferably heated to 1100° C. or more to prevent an increase in rolling force and dissolve carbides. A slab is preferably heated to 1300° C. or less to prevent an increase in scale loss.

When a slab is hot-rolled, to prevent troubles while rolling at a low slab heating temperature, a rough bar after rough rolling may be heated. A continuous rolling process of joining rough bars together and continuously finish-rolling the rough bars is also applicable. To reduce rolling force or make the shape and material quality uniform, rolling with lubrication at a friction coefficient in the range of 0.10 to 0.25 is preferably performed in all or part of the passes of finish rolling.

Scales may be removed by pickling or the like from a steel sheet after coiling. After pickling, cold-rolling, annealing, and galvanization are performed under the conditions described above.

Next, a member according to the disclosed embodiments and a method for producing the member are described below.

A member according to the disclosed embodiments is produced by performing at least one of forming and welding on a galvanized steel sheet according to the embodiment. A method for producing a member according to the disclosed embodiments includes the step of performing at least one of forming and welding on a galvanized steel sheet produced by a method for producing a galvanized steel sheet according to the embodiment.

A galvanized steel sheet according to the disclosed embodiments has high strength and good collision characteristics. Thus, a member produced by using a galvanized steel sheet according to the disclosed embodiments also has high strength, good collision characteristics, and is less likely to be broken in collision deformation. Thus, a member according to the disclosed embodiments can be suitably used as an energy-absorbing member in an automotive part.

The forming may be any typical processing method, such as press forming. The welding may be any typical welding, such as spot welding or arc welding.

EXAMPLES

The disclosed embodiments are more specifically described with reference to examples. The scope of the disclosure is not intended to be limited to the following examples.

Example 1

A steel with the chemical composition shown in Table 1 was obtained by steelmaking in a vacuum melting furnace and was then bloomed into a steel slab. These steel slabs were heated and subjected to hot-rolling, cold-rolling, annealing, coating treatment, quenching and tempering, and cooling under the conditions shown in Table 2 to produce galvanized steel sheets. In the coating treatment, an electrogalvanized layer (EG), a hot-dip galvanized layer (GI), or a hot-dip galvannealed layer (GA) was formed on a surface of the steel sheet. In electrogalvanizing treatment, an electric current is passing through a steel sheet immersed in a zinc solution to form an electrogalvanized layer (EG) with a coating weight in the range of 10 to 100 $g/m^2$. In hot-dip galvanizing treatment, a steel sheet was immersed in a coating bath to form a hot-dip galvanized layer (GI) with a coating weight in the range of 10 to 100 $g/m^2$. In hot-dip galvannealing, after a hot-dip galvanized layer was formed on a steel sheet, an alloying treatment was performed to form a hot-dip galvannealed layer (GA). Each galvanized steel sheet had a final thickness of 1.2 mm.

TABLE 1

| Type of steel | Chemical composition (mass %) | | | | | | | | | | | | | | | |
|---|---|---|---|---|---|---|---|---|---|---|---|---|---|---|---|---|
| | C | Si | Mn | P | S | Sol. Al | N | Cr | Mo | V | Ti | Nb | B | Ni | Cu |
| A | 0.10 | 1.50 | 2.1 | 0.008 | 0.010 | 0.030 | 0.0028 | 0 | 0.100 | 0 | 0.020 | 0 | 0.0020 | 0 | 0 |
| B | 0.03 | 1.80 | 2.4 | 0.030 | 0.010 | 0.021 | 0.0035 | 0 | 0 | 0 | 0 | 0 | 0 | 0 | 0 |
| C | 0.20 | 1.30 | 1.0 | 0.040 | 0.020 | 0.050 | 0.0022 | 0 | 0 | 0 | 0 | 0 | 0 | 0 | 0 |
| D | 0.12 | 0.10 | 1.8 | 0.020 | 0.020 | 0.045 | 0.0042 | 0 | 0 | 0 | 0 | 0 | 0 | 0 | 0 |
| E | 0.07 | 2.00 | 1.7 | 0.020 | 0.010 | 0.058 | 0.0016 | 0 | 0 | 0 | 0 | 0 | 0 | 0 | 0 |
| F | 0.19 | 1.90 | 0.5 | 0.020 | 0.010 | 0.012 | 0.0021 | 0 | 0 | 0 | 0 | 0 | 0 | 0 | 0 |
| G | 0.03 | 1.50 | 2.5 | 0.030 | 0.010 | 0.023 | 0.0040 | 0 | 0 | 0 | 0 | 0 | 0 | 0 | 0 |
| H | 0.12 | 0.60 | 1.8 | 0.050 | 0.010 | 0.009 | 0.0029 | 0 | 0 | 0 | 0 | 0 | 0 | 0 | 0 |
| I | 0.13 | 1.30 | 1.6 | 0.040 | 0.050 | 0.029 | 0.0026 | 0 | 0 | 0 | 0 | 0 | 0 | 0 | 0 |
| J | 0.15 | 1.70 | 1.0 | 0.010 | 0.030 | 0.005 | 0.0038 | 0 | 0 | 0 | 0 | 0 | 0 | 0 | 0 |
| K | 0.16 | 1.60 | 1.8 | 0.040 | 0.010 | 0.100 | 0.0027 | 0 | 0 | 0 | 0 | 0 | 0 | 0 | 0 |
| L | 0.05 | 0.90 | 1.6 | 0.020 | 0.010 | 0.010 | 0.0100 | 0 | 0 | 0 | 0 | 0 | 0 | 0 | 0 |
| M | 0.11 | 1.10 | 2.4 | 0.020 | 0.020 | 0.050 | 0.0018 | 0.005 | 0 | 0 | 0 | 0 | 0 | 0 | 0 |
| N | 0.09 | 1.30 | 1.5 | 0.010 | 0.010 | 0.054 | 0.0064 | 1.000 | 0 | 0 | 0.007 | 0 | 0 | 0 | 0 |
| O | 0.12 | 1.40 | 2.1 | 0.010 | 0.020 | 0.008 | 0.0051 | 0 | 0.005 | 0 | 0 | 0 | 0 | 0 | 0 |
| P | 0.10 | 1.10 | 1.9 | 0.030 | 0.010 | 0.007 | 0.0046 | 0 | 0.500 | 0 | 0 | 0 | 0 | 0 | 0 |
| Q | 0.13 | 1.20 | 1.6 | 0.010 | 0.010 | 0.011 | 0.0033 | 0 | 0 | 0.005 | 0 | 0.031 | 0 | 0 | 0 |
| R | 0.12 | 0.50 | 1.7 | 0.010 | 0.010 | 0.034 | 0.0028 | 0 | 0 | 0.500 | 0 | 0 | 0 | 0.021 | 0 |
| S | 0.16 | 1.50 | 2.1 | 0.020 | 0.020 | 0.080 | 0.0029 | 0 | 0 | 0 | 0.005 | 0 | 0 | 0 | 0 |
| T | 0.11 | 1.60 | 1.5 | 0.010 | 0.010 | 0.021 | 0.0061 | 0.020 | 0 | 0 | 0.500 | 0 | 0.0020 | 0 | 0 |
| U | 0.15 | 1.80 | 2.0 | 0.010 | 0.010 | 0.027 | 0.0041 | 0 | 0 | 0 | 0 | 0.005 | 0 | 0 | 0.041 |
| V | 0.11 | 1.50 | 1.6 | 0.010 | 0.020 | 0.008 | 0.0031 | 0 | 0.150 | 0 | 0 | 0.500 | 0 | 0 | 0 |
| W | 0.15 | 1.40 | 2.3 | 0.010 | 0.020 | 0.019 | 0.0029 | 0 | 0 | 0 | 0 | 0 | 0.0003 | 0 | 0 |
| X | 0.14 | 1.10 | 1.7 | 0.010 | 0.010 | 0.070 | 0.0025 | 0 | 0 | 0 | 0.210 | 0 | 0.0050 | 0 | 0 |
| Y | 0.18 | 1.00 | 1.5 | 0.020 | 0.010 | 0.056 | 0.0034 | 0 | 0 | 0.100 | 0 | 0 | 0 | 0.005 | 0 |
| Z | 0.16 | 0.90 | 1.7 | 0.010 | 0.020 | 0.045 | 0.0055 | 0 | 0.200 | 0 | 0 | 0 | 0 | 1.000 | 0 |
| AA | 0.17 | 0.50 | 2.2 | 0.010 | 0.040 | 0.057 | 0.0034 | 0 | 0 | 0 | 0.120 | 0 | 0 | 0 | 0.005 |
| AB | 0.13 | 1.40 | 2.3 | 0.030 | 0.030 | 0.049 | 0.0023 | 0 | 0 | 0 | 0 | 0 | 0 | 0 | 1.000 |
| AC | 0.15 | 1.50 | 1.6 | 0.010 | 0.010 | 0.022 | 0.0046 | 0.110 | 0 | 0 | 0 | 0 | 0 | 0 | 0 |
| AD | 0.08 | 1.80 | 2.2 | 0.010 | 0.010 | 0.009 | 0.0020 | 0 | 0 | 0 | 0 | 0.022 | 0 | 0 | 0 |
| AE | 0.10 | 1.30 | 1.9 | 0.020 | 0.010 | 0.015 | 0.0016 | 0 | 0 | 0 | 0 | 0 | 0 | 0 | 0.008 |

TABLE 1-continued

| | | | | | | | | | | | | | | | |
|---|---|---|---|---|---|---|---|---|---|---|---|---|---|---|---|
| AF | 0.07 | 1.10 | 2.4 | 0.020 | 0.020 | 0.033 | 0.0054 | 0 | 0 | 0 | 0 | 0 | 0 | 0 | 0 |
| AG | 0.09 | 1.50 | 2.0 | 0.010 | 0.040 | 0.031 | 0.0043 | 0 | 0 | 0 | 0 | 0 | 0.0018 | 0 | 0 |
| AH | 0.11 | 1.50 | 1.9 | 0.030 | 0.030 | 0.029 | 0.0033 | 0 | 0 | 0 | 0 | 0 | 0 | 0 | 0 |
| AI | 0.12 | 1.30 | 1.7 | 0.030 | 0.020 | 0.035 | 0.0062 | 0 | 0.250 | 0 | 0 | 0 | 0 | 0.081 | 0 |
| AJ | 0.07 | 1.80 | 2.0 | 0.010 | 0.020 | 0.088 | 0.0043 | 0 | 0 | 0.150 | 0 | 0 | 0 | 0 | 0 |
| AK | 0.02 | 1.60 | 1.5 | 0.040 | 0.040 | 0.026 | 0.0026 | 0 | 0 | 0 | 0 | 0 | 0 | 0 | 0 |
| AL | 0.21 | 1.60 | 2.0 | 0.010 | 0.010 | 0.045 | 0.0029 | 0 | 0 | 0 | 0 | 0 | 0 | 0 | 0 |
| AM | 0.11 | 0.09 | 1.9 | 0.020 | 0.010 | 0.035 | 0.0031 | 0 | 0 | 0 | 0 | 0 | 0 | 0 | 0 |
| AN | 0.18 | 1.30 | 0.4 | 0.010 | 0.010 | 0.069 | 0.0041 | 0 | 0 | 0 | 0 | 0 | 0 | 0 | 0 |
| AO | 0.12 | 0.90 | 2.6 | 0.010 | 0.010 | 0.061 | 0.0025 | 0 | 0 | 0 | 0 | 0 | 0 | 0 | 0 |
| AP | 0.13 | 1.20 | 1.9 | 0.060 | 0.010 | 0.035 | 0.0036 | 0 | 0 | 0 | 0 | 0 | 0 | 0 | 0 |
| AQ | 0.09 | 1.50 | 1.7 | 0.010 | 0.060 | 0.021 | 0.0060 | 0 | 0 | 0 | 0 | 0 | 0 | 0 | 0 |
| AR | 0.05 | 1.00 | 1.9 | 0.010 | 0.010 | 0.004 | 0.0050 | 0 | 0 | 0 | 0 | 0 | 0 | 0 | 0 |
| AS | 0.05 | 1.90 | 2.2 | 0.010 | 0.010 | 0.044 | 0.0105 | 0 | 0 | 0 | 0 | 0 | 0 | 0 | 0 |

| Type of steel | Chemical composition (mass %) | | | | Ceq (%) |
|---|---|---|---|---|---|
| | Sn | Sb | Ca | REM | |
| A | 0 | 0 | 0 | 0 | 0.54 |
| B | 0 | 0 | 0 | 0 | 0.51 |
| C | 0 | 0 | 0 | 0 | 0.42 |
| D | 0 | 0 | 0 | 0 | 0.42 |
| E | 0 | 0 | 0 | 0 | 0.44 |
| F | 0 | 0 | 0 | 0 | 0.35 |
| G | 0 | 0 | 0 | 0 | 0.51 |
| H | 0 | 0 | 0 | 0 | 0.45 |
| I | 0 | 0 | 0 | 0 | 0.45 |
| J | 0 | 0 | 0 | 0 | 0.39 |
| K | 0 | 0 | 0 | 0 | 0.53 |
| L | 0 | 0 | 0 | 0 | 0.35 |
| M | 0.014 | 0 | 0 | 0 | 0.56 |
| N | 0 | 0 | 0 | 0 | 0.59 |
| O | 0 | 0 | 0 | 0.003 | 0.53 |
| P | 0 | 0.031 | 0 | 0 | 0.59 |
| Q | 0 | 0 | 0 | 0 | 0.45 |
| R | 0 | 0 | 0 | 0 | 0.46 |
| S | 0 | 0 | 0.002 | 0 | 0.57 |
| T | 0 | 0 | 0 | 0 | 0.43 |
| U | 0 | 0 | 0 | 0 | 0.56 |
| V | 0 | 0 | 0 | 0 | 0.48 |
| W | 0.009 | 0 | 0 | 0 | 0.59 |
| X | 0 | 0 | 0 | 0 | 0.47 |
| Y | 0 | 0 | 0 | 0 | 0.48 |
| Z | 0 | 0 | 0 | 0 | 0.56 |
| AA | 0 | 0 | 0 | 0 | 0.56 |
| AB | 0 | 0 | 0 | 0 | 0.57 |
| AC | 0.005 | 0 | 0 | 0 | 0.50 |
| AD | 1.000 | 0 | 0 | 0 | 0.52 |
| AE | 0 | 0.005 | 0 | 0 | 0.47 |
| AF | 0 | 1.000 | 0 | 0.002 | 0.52 |
| AG | 0 | 0 | 0.001 | 0 | 0.49 |
| AH | 0 | 0.019 | 0.005 | 0 | 0.49 |
| AI | 0 | 0 | 0 | 0.001 | 0.52 |
| AJ | 0 | 0 | 0 | 0.005 | 0.49 |
| AK | 0 | 0 | 0 | 0 | 0.34 |
| AL | 0 | 0 | 0 | 0 | 0.61 |
| AM | 0 | 0 | 0 | 0 | 0.43 |
| AN | 0 | 0 | 0 | 0 | 0.30 |
| AO | 0 | 0 | 0 | 0 | 0.59 |
| AP | 0 | 0 | 0 | 0 | 0.50 |
| AQ | 0 | 0 | 0 | 0 | 0.44 |
| AR | 0 | 0 | 0 | 0 | 0.41 |
| AS | 0 | 0 | 0 | 0 | 0.50 |

Ceq: equivalent carbon content

Remainder other than the chemical composition above: Fe and incidental impurities

TABLE 2

| | | Hot-rolling | | Cold-rolling | Annealing conditions | | Coating | | | Quenching and tempering | | |
|---|---|---|---|---|---|---|---|---|---|---|---|---|
| Steel sheet No. | Type of steel | Finish rolling temperature (° C.) | Coiling temperature (° C.) | Rolling reduction (%) | Annealing temperature (° C.) | Holding time (s) | Holding temperature (° C.) | Holding time (s) | Type | Ms (° C.) | Ms-50 (° C.) | Ms-250 (° C.) |
| 1 | A | 900 | 550 | 50 | 800 | 100 | 400 | 30 | GA | 379 | 329 | 129 |
| 2 | A | 850 | 570 | 35 | 790 | 190 | 420 | 100 | GI | 375 | 325 | 125 |
| 3 | A | 950 | 540 | 45 | 820 | 480 | 380 | 50 | GA | 387 | 337 | 137 |
| 4 | A | 870 | 600 | 70 | 800 | 150 | 410 | 70 | GA | 379 | 329 | 129 |
| 5 | A | 920 | 540 | 50 | 760 | 30 | 510 | 20 | GI | 361 | 311 | 111 |
| 6 | A | 880 | 570 | 30 | 810 | 290 | 600 | 10 | GA | 383 | 333 | 133 |
| 7 | A | 860 | 590 | 65 | 780 | 360 | 300 | 300 | GA | 371 | 321 | 121 |
| 8 | A | 940 | 550 | 40 | 780 | 320 | 390 | 100 | GI | 371 | 321 | 121 |
| 9 | A | 890 | 580 | 60 | 840 | 270 | 420 | 50 | GA | 395 | 345 | 145 |
| 10 | A | 860 | 480 | 35 | 790 | 250 | 400 | 130 | GA | 375 | 325 | 125 |
| 11 | A | 900 | 560 | 40 | 830 | 160 | 340 | 200 | GA | 391 | 341 | 141 |
| 12 | A | 880 | 510 | 60 | 770 | 90 | 480 | 30 | GI | 366 | 316 | 116 |
| 13 | A | 900 | 580 | 30 | 840 | 440 | 360 | 160 | GA | 395 | 345 | 145 |
| 14 | B | 890 | 520 | 70 | 860 | 370 | 310 | 210 | GI | 439 | 389 | 189 |
| 15 | B | 840 | 570 | 50 | 750 | 310 | 350 | 150 | GA | 400 | 350 | 150 |
| 16 | C | 920 | 460 | 45 | 720 | 220 | 410 | 90 | GI | 264 | 214 | 14 |
| 17 | C | 960 | 530 | 65 | 740 | 330 | 370 | 180 | EG | 283 | 233 | 33 |
| 18 | D | 920 | 450 | 30 | 810 | 200 | 400 | 110 | GA | 378 | 328 | 128 |
| 19 | D | 860 | 610 | 40 | 730 | 110 | 440 | 40 | GI | 336 | 286 | 86 |
| 20 | E | 930 | 460 | 75 | 760 | 490 | 400 | 80 | GA | 390 | 340 | 140 |
| 21 | E | 900 | 540 | 30 | 710 | 150 | 380 | 130 | GA | 324 | 274 | 74 |
| 22 | F | 870 | 560 | 50 | 800 | 130 | 350 | 160 | EG | 318 | 268 | 68 |
| 23 | F | 940 | 510 | 65 | 730 | 25 | 430 | 80 | GI | 101 | 51 | −149 |
| 24 | G | 880 | 450 | 40 | 790 | 400 | 400 | 50 | GA | 422 | 372 | 172 |
| 25 | G | 930 | 490 | 55 | 760 | 130 | 520 | 5 | GI | 429 | 379 | 179 |
| 26 | H | 880 | 470 | 50 | 860 | 430 | 310 | 230 | GA | 400 | 350 | 150 |
| 27 | H | 900 | 530 | 35 | 750 | 200 | 420 | 310 | GA | 382 | 332 | 132 |
| 28 | I | 930 | 580 | 55 | 810 | 450 | 440 | 60 | GI | 377 | 327 | 127 |
| 29 | I | 870 | 540 | 60 | 740 | 150 | 460 | 70 | GA | 340 | 290 | 90 |
| 30 | J | 890 | 480 | 50 | 780 | 260 | 380 | 150 | GA | 334 | 284 | 84 |
| 31 | J | 920 | 500 | 55 | 770 | 350 | 370 | 120 | GI | 401 | 351 | 151 |
| 32 | K | 880 | 570 | 30 | 820 | 70 | 400 | 100 | GA | 364 | 314 | 114 |
| 33 | K | 930 | 550 | 45 | 830 | 480 | 350 | 240 | GI | 370 | 320 | 120 |
| 34 | L | 890 | 520 | 60 | 860 | 370 | 360 | 170 | GA | 448 | 398 | 198 |
| 35 | L | 860 | 490 | 40 | 790 | 110 | 400 | 50 | GI | 424 | 374 | 174 |
| 36 | M | 920 | 570 | 65 | 770 | 550 | 370 | 110 | GA | 359 | 309 | 109 |
| 37 | M | 910 | 480 | 45 | 770 | 260 | 400 | 60 | GI | 359 | 309 | 109 |
| 38 | N | 880 | 520 | 55 | 780 | 390 | 410 | 80 | EG | 372 | 322 | 122 |
| 39 | N | 880 | 550 | 45 | 850 | 330 | 380 | 130 | GA | 405 | 355 | 155 |
| 40 | O | 900 | 590 | 60 | 790 | 210 | 420 | 60 | GI | 364 | 314 | 114 |
| 41 | O | 900 | 590 | 60 | 790 | 210 | 420 | 60 | GI | 364 | 314 | 114 |
| 42 | P | 890 | 510 | 35 | 780 | 200 | 400 | 90 | GI | 343 | 293 | 93 |
| 43 | Q | 890 | 500 | 50 | 820 | 280 | 380 | 140 | EG | 396 | 346 | 146 |
| 44 | R | 920 | 550 | 45 | 810 | 120 | 350 | 200 | GI | 377 | 327 | 127 |
| 45 | S | 900 | 490 | 40 | 830 | 220 | 400 | 70 | GI | 362 | 312 | 112 |
| 46 | T | 870 | 550 | 30 | 850 | 210 | 330 | 260 | GA | 404 | 354 | 154 |
| 47 | U | 890 | 450 | 70 | 800 | 250 | 400 | 100 | GI | 367 | 317 | 117 |
| 48 | V | 900 | 580 | 65 | 750 | 160 | 390 | 91 | GI | 411 | 361 | 161 |
| 49 | W | 930 | 510 | 35 | 760 | 410 | 400 | 30 | GI | 332 | 282 | 82 |
| 50 | X | 870 | 560 | 65 | 770 | 320 | 360 | 150 | GA | 346 | 296 | 96 |
| 51 | Y | 910 | 520 | 60 | 800 | 270 | 370 | 100 | GA | 340 | 290 | 90 |
| 52 | Z | 920 | 470 | 45 | 780 | 330 | 420 | 80 | GA | 318 | 268 | 68 |
| 53 | AA | 910 | 540 | 40 | 830 | 150 | 400 | 40 | EG | 349 | 299 | 99 |
| 54 | AB | 880 | 470 | 65 | 810 | 320 | 370 | 120 | GA | 367 | 317 | 117 |
| 55 | AC | 910 | 510 | 45 | 800 | 120 | 340 | 140 | GA | 353 | 303 | 103 |
| 56 | AD | 940 | 480 | 50 | 780 | 310 | 430 | 60 | GI | 410 | 360 | 160 |
| 57 | AE | 860 | 500 | 50 | 770 | 450 | 400 | 90 | GA | 371 | 321 | 121 |
| 58 | AF | 910 | 510 | 70 | 760 | 330 | 380 | 110 | GI | 381 | 331 | 131 |
| 59 | AG | 920 | 590 | 35 | 770 | 390 | 400 | 50 | GA | 375 | 325 | 125 |
| 60 | AH | 890 | 460 | 55 | 790 | 310 | 380 | 120 | GA | 375 | 325 | 125 |
| 61 | AI | 910 | 530 | 50 | 830 | 220 | 410 | 90 | GA | 386 | 336 | 136 |
| 62 | AJ | 880 | 530 | 60 | 780 | 500 | 340 | 180 | GI | 394 | 344 | 144 |
| 63 | AK | 900 | 550 | 60 | 770 | 550 | 340 | 150 | GI | 449 | 399 | 199 |
| 64 | AL | 890 | 570 | 65 | 790 | 300 | 400 | 40 | GA | 309 | 259 | 59 |
| 65 | AM | 930 | 520 | 40 | 840 | 380 | 430 | 70 | GA | 399 | 349 | 149 |
| 66 | AN | 870 | 480 | 65 | 790 | 350 | 350 | 160 | GI | 104 | 54 | −146 |

TABLE 2-continued

| 67 | AO | 900 | 510 | 60 | 740 | 90 | 360 | 110 | GA | 357 | 307 | 107 |
| 68 | AP | 920 | 540 | 55 | 800 | 390 | 440 | 60 | GI | 372 | 322 | 122 |
| 69 | AQ | 870 | 500 | 50 | 830 | 60 | 380 | 100 | EG | 405 | 355 | 155 |
| 70 | AR | 890 | 540 | 60 | 770 | 240 | 460 | 40 | GA | 408 | 358 | 158 |
| 71 | AS | 870 | 520 | 50 | 800 | 310 | 500 | 30 | GA | 413 | 363 | 114 |

| | Quenching and tempering | | | | |
|---|---|---|---|---|---|
| Steel sheet No. | Finish cooling temperature (° C.) | Tempering temperature (° C.) | Holding time (s) | Cooling *1 (° C./s) | Note |
| 1 | 200 | 400 | 50 | 30 | Example |
| 2 | 190 | 370 | 110 | 45 | Example |
| 3 | 180 | 320 | 70 | 50 | Example |
| 4 | 190 | 360 | 120 | 30 | Example |
| 5 | 200 | 320 | 60 | 70 | Example |
| 6 | 210 | 340 | 170 | 25 | Example |
| 7 | 230 | 380 | 60 | 50 | Example |
| 8 | 220 | 350 | 260 | 45 | Example |
| 9 | 160 | 440 | 110 | 35 | Example |
| 10 | 220 | 300 | 490 | 55 | Example |
| 11 | 190 | 500 | 120 | 60 | Example |
| 12 | 250 | 400 | 20 | 25 | Example |
| 13 | 230 | 450 | 260 | 20 | Example |
| 14 | 300 | 450 | 320 | 35 | Example |
| 15 | 310 | 460 | 210 | 45 | Comparative example |
| 16 | 140 | 370 | 90 | 40 | Example |
| 17 | 160 | 420 | 60 | 50 | Comparative example |
| 18 | 210 | 380 | 130 | 55 | Example |
| 19 | 260 | 480 | 360 | 60 | Comparative example |
| 20 | 290 | 370 | 450 | 35 | Example |
| 21 | 250 | 420 | 110 | 25 | Comparative example |
| 22 | 110 | 390 | 100 | 40 | Example |
| 23 | 50 | 320 | 70 | 60 | Comparative example |
| 24 | 290 | 410 | 360 | 45 | Example |
| 25 | 360 | 340 | 40 | 30 | Comparative example |
| 26 | 210 | 370 | 90 | 35 | Example |
| 27 | 280 | 460 | 130 | 40 | Comparative example |
| 28 | 200 | 480 | 110 | 65 | Example |
| 29 | 300 | 430 | 330 | 35 | Comparative example |
| 30 | 180 | 370 | 290 | 25 | Example |
| 31 | 140 | 450 | 60 | 50 | Comparative example |
| 32 | 140 | 410 | 150 | 55 | Example |
| 33 | 150 | 290 | 260 | 60 | Comparative example |
| 34 | 250 | 380 | 60 | 35 | Example |
| 35 | 340 | 510 | 90 | 25 | Comparative example |
| 36 | 250 | 420 | 150 | 45 | Example |
| 37 | 260 | 390 | 18 | 40 | Comparative example |
| 38 | 270 | 380 | 110 | 30 | Example |
| 39 | 180 | 400 | 500 | 18 | Comparative example |
| 40 | 230 | 310 | 180 | 25 | Example |
| 41 | 290 | 400 | 510 | 25 | Comparative example |
| 42 | 170 | 420 | 60 | 55 | Example |
| 43 | 220 | 370 | 460 | 60 | Example |
| 44 | 240 | 410 | 300 | 60 | Example |
| 45 | 280 | 430 | 110 | 40 | Example |
| 46 | 230 | 420 | 90 | 35 | Example |
| 47 | 220 | 440 | 400 | 30 | Example |
| 48 | 180 | 420 | 70 | 25 | Example |
| 49 | 170 | 310 | 50 | 40 | Example |
| 50 | 270 | 390 | 490 | 55 | Example |
| 51 | 270 | 460 | 180 | 50 | Example |
| 52 | 190 | 350 | 120 | 60 | Example |
| 53 | 270 | 430 | 160 | 40 | Example |
| 54 | 230 | 380 | 110 | 30 | Example |
| 55 | 170 | 340 | 70 | 35 | Example |
| 56 | 200 | 400 | 130 | 55 | Example |
| 57 | 240 | 370 | 100 | 40 | Example |
| 58 | 160 | 390 | 60 | 50 | Example |
| 59 | 190 | 430 | 230 | 30 | Example |
| 60 | 280 | 380 | 70 | 25 | Example |
| 61 | 210 | 340 | 110 | 40 | Example |
| 62 | 300 | 400 | 360 | 60 | Example |
| 63 | 260 | 440 | 60 | 40 | Comparative example |
| 64 | 200 | 400 | 410 | 25 | Comparative example |
| 65 | 220 | 350 | 50 | 65 | Comparative example |
| 66 | 40 | 380 | 140 | 30 | Comparative example |
| 67 | 200 | 350 | 60 | 30 | Comparative example |

TABLE 2-continued

| | | | | | |
|---|---|---|---|---|---|
| 68 | 240 | 410 | 460 | 50 | Comparative example |
| 69 | 210 | 470 | 210 | 25 | Comparative example |
| 70 | 230 | 390 | 200 | 40 | Comparative example |
| 71 | 250 | 400 | 190 | 65 | Comparative example |

*1: Average cooling rate from tempering temperature to 50° C.
EG: Electrogalvanizing, GI: Hot-dip galvanizing, GA: Hot-dip galvannealing The galvanized steel sheets were subjected to temper rolling at a rolling reduction of 0.2%, and then the area fractions of ferrite (F), bainite (B), tempered martensite (TM), fresh martensite (FM), and retained austenite (RA) were determined by the following method. Each galvanized steel sheet was subjected to 90-degree bending at a curvature radius/thickness ratio of 4.2 in the rolling (L) direction with respect to an axis extending in the width (C) direction by the following method. The number of voids per $mm^2$ was then measured in an L cross section in a 0- to 50-µm region from a surface of the steel sheet on the compression side.

The area fraction of each microstructure is measured in the following way. A thickness cross section of a steel sheet cut at a right angle to the rolling direction was polished and etched in 3% by volume nital and was photographed at a quarter thickness position with a scanning electron microscope (SEM) at a magnification of 1500 times in three visual fields. The area fraction of each microstructure was determined from the captured image data using Image-Pro available from Media Cybernetics. The area fraction of each microstructure in the disclosed embodiments was the average area fraction of the three visual fields.

In the image data, ferrite was distinguished as black, bainite as black including island-like retained austenite or gray including carbides with the same orientation, tempered martensite as light gray including fine carbides with different orientations, and retained austenite as white. Fresh martensite is also white, and fresh martensite and retained austenite are difficult to distinguish in SEM images. Thus, the area fraction of fresh martensite was determined by subtracting the area fraction of retained austenite determined by a method described later from the total area fraction of fresh martensite and retained austenite. Although not shown in Table 3, the remaining microstructures were determined by subtracting the total area fraction of ferrite (F), bainite (B), tempered martensite (TM), fresh martensite (FM), and retained austenite (RA) from 100%, and the remaining microstructures were considered to be pearlite and/or cementite.

An X-ray diffraction intensity was measured to determine the volume fraction of retained austenite, and the volume fraction was regarded as the area fraction of retained austenite. The volume fraction of retained austenite was determined as the ratio of the integrated X-ray diffraction intensity of (200), (220), and (311) planes in fcc iron to the integrated X-ray diffraction intensity of (200), (211), and (220) planes in bcc iron at a quarter thickness.

The solute C content of retained austenite was measured by analysis with a field-emission electron probe microanalyzer (FE-SPMA).

The aspect ratio of retained austenite was measured in the following way. After a thickness cross section of a steel sheet cut at a right angle to the rolling direction was polished, the surface was smoothed by buffing with a colloidal silica solution and was etched with 0.1% by volume nital. This reduced the unevenness of the sample surface as much as possible and completely removed a work affected layer. Next, a high-resolution crystal orientation analysis was performed at a quarter thickness position by an electron beam backscatter diffraction (SEM-EBSD) method. The data were analyzed using OIM Analysis available from TSL. FCC iron was defined as retained austenite, and the major axis/minor axis was defined as an aspect ratio. (The number of retained austenite grains with an aspect ratio of less than 2.0)/(the number of all retained austenite grains) was measured in three visual fields. The average measured value in the three visual fields was taken as a ratio of retained austenite grains with an aspect ratio of less than 2.0 to all retained austenite grains.

The number density of voids is measured by the following method. A galvanized steel sheet was subjected to 90-degree bending at a curvature radius/thickness ratio of 4.2 in the rolling (L) direction with respect to an axis extending in the width (C) direction. The thickness cross section was then polished, and an L cross section in a 0- to 50-µm region from a surface of the steel sheet on the compression side was observed. The L cross section was photographed with a scanning electron microscope (SEM) at a magnification of 1500 times in three visual fields, and the number density of voids was determined from the captured image data using Image-Pro available from Media Cybernetics. The average number density in the three visual fields was defined as the number density of voids. Voids are darker black than ferrite and can be clearly distinguished from microstructures.

The measurement position of a void after bending in the rolling direction was in a region including a corner X0 formed by the bending and extending in the width (C) direction (see the reference letter D1 in FIG. 1). More specifically, in a region that became the lowest portion in the width direction and in a direction perpendicular to the rolling direction (a pressing direction of a pressing portion, such as a punch) by bending, the number density of voids was measured in a 0- to 50-µm region in the thickness direction (see the reference letter XA in FIG. 1).

Tensile properties and collision characteristics were determined by the following test methods.

<Tensile Test>

The tensile strength (TS) was determined by taking a JIS No. 5 test piece for tensile test (JIS Z 2201) from a galvanized steel sheet in a direction perpendicular to the rolling direction and performing a tensile test at a strain rate of $10^3$/s in accordance with JIS Z 2241 (2011). A TS of 590 MPa or more was judged to be acceptable.

<Bending-Orthogonal Bending Test>

A steel sheet was subjected to 90-degree bending (primary bending) at a curvature radius/thickness ratio of 4.2 in the rolling (L) direction with respect to an axis extending in the width (C) direction to prepare a test specimen. In the 90-degree bending (primary bending), as illustrated in FIG. 2, a punch B1 was pressed against a steel sheet on a die A1 with a V-groove to prepare a test specimen T1. Next, as illustrated in FIG. 3, the test specimen T1 on support rolls A2 was subjected to orthogonal bending (secondary bending) by pressing a punch B2 against the test specimen T1 in the direction perpendicular to the rolling direction. In FIGS. 2 and 3, D1 denotes the width (C) direction, and D2 denotes the rolling (L) direction.

FIG. 4 illustrates the test specimen T1 after the steel sheet is subjected to the 90-degree bending (primary bending). FIG. 5 illustrates the test specimen T2 after the test specimen T1 is subjected to the orthogonal bending (secondary bending). The positions indicated by the broken lines on the test specimen T2 in FIG. 5 correspond to the positions indicated by the broken lines on the test specimen T1 in FIG. 4 before the orthogonal bending.

The conditions for the orthogonal bending are as follows:
[Orthogonal Bending Conditions]
  Test method: roll support, punch pressing
  Roll diameter: φ30 mm
  Punch tip R: 0.4 mm
  Distance between rolls: (sheet thickness×2)+0.5 mm
  Stroke speed: 20 mm/min
  Test specimen size: 60 mm×60 mm
  Bending direction: a direction perpendicular to the rolling direction The stroke at the maximum load was determined in a stroke-load curve of the orthogonal bending. The average stroke ΔS at the maximum load was determined by performing the bending-orthogonal bending test three times. ΔS of 30 mm or more was judged to be high fracture resistance.

<Axial Crushing Test>

An axial crushing test was performed on galvanized steel sheets 1.2 mm in thickness in consideration of the effects of the thickness. A galvanized steel sheet produced through the production steps described above was cut and formed (bent) to a depth of 40 mm using a die with a punch shoulder radius of 5.0 mm and a die shoulder radius of 5.0 mm to produce a hat-shaped member 10 illustrated in FIGS. 6 and 7. The galvanized steel sheet used as the material of the hat-shaped member was separately cut into a size of 200 mm×80 mm. Next, a galvanized steel sheet 20 thus cut out and the hat-shaped member 10 were spot welded to produce a test member 30 as illustrated in FIGS. 6 and 7. FIG. 6 is a front view of the test member 30 produced by spot-welding the hat-shaped member 10 and the galvanized steel sheet 20. FIG. 7 is a perspective view of the test member 30. As illustrated in FIG. 7, spot welds 40 were positioned such that the distance between an end portion of the galvanized steel sheet and a weld was 10 mm and the distance between the welds was 45 mm. Next, as illustrated in FIG. 8, the test member 30 was joined to a base plate 50 by TIG welding to prepare a sample for the axial crushing test. Next, the prepared axial crushing test sample was collided with an impactor 60 at a constant impact speed of 10 m/s to crush the axial crushing test sample by 100 mm. As illustrated in FIG. 8, the crushing direction D3 was parallel to the longitudinal direction of the test member 30. The area in a crushing stroke-load graph at a stroke in the range of 0 to 100 mm was determined, and the average area of the test performed three times was taken as absorbed energy ($F_{ave}$). $F_{ave}$ of 35000 N or more was judged to be high absorbed energy. Collision characteristics were judged to be good when both fracture resistance and absorbed energy were high.

TABLE 3

| Steel sheet No. | V(F) (%) | V(RA) (%) | V(TM + B) (%) | V(FM) (%) | V(F + RA + TM + B + FM) (%) | *1 (mass %) | *2 (%) | *3 (/mm²) | Tensile strength TS (MPa) | Bending test ΔS (mm) | Axial crushing test $F_{ave}$ (N) | Note |
|---|---|---|---|---|---|---|---|---|---|---|---|---|
| 1 | 56 | 6 | 32 | 5 | 99 | 0.7 | 78 | 185 | 793 | 34 | 38832 | Example |
| 2 | 58 | 6 | 32 | 2 | 98 | 0.9 | 73 | 556 | 784 | 34 | 38207 | Example |
| 3 | 52 | 6 | 33 | 6 | 97 | 0.7 | 76 | 741 | 840 | 35 | 39007 | Example |
| 4 | 56 | 5 | 35 | 2 | 99 | 0.9 | 73 | 370 | 798 | 34 | 38926 | Example |
| 5 | 63 | 6 | 27 | 2 | 98 | 0.8 | 77 | 0 | 761 | 33 | 37083 | Example |
| 6 | 54 | 8 | 33 | 4 | 99 | 1.0 | 71 | 370 | 820 | 34 | 38919 | Example |
| 7 | 60 | 7 | 27 | 5 | 99 | 0.7 | 78 | 556 | 772 | 33 | 37751 | Example |
| 8 | 60 | 12 | 19 | 7 | 98 | 1.1 | 65 | 741 | 785 | 32 | 36689 | Example |
| 9 | 47 | 6 | 40 | 6 | 99 | 0.8 | 73 | 370 | 842 | 34 | 38480 | Example |
| 10 | 58 | 6 | 32 | 3 | 99 | 1.0 | 55 | 741 | 799 | 34 | 38113 | Example |
| 11 | 50 | 7 | 34 | 5 | 96 | 0.8 | 74 | 556 | 816 | 35 | 39853 | Example |
| 12 | 61 | 8 | 24 | 4 | 98 | 0.9 | 81 | 185 | 757 | 32 | 36856 | Example |
| 13 | 47 | 7 | 40 | 4 | 99 | 0.8 | 62 | 185 | 842 | 35 | 39250 | Example |
| 14 | 54 | 10 | 31 | 5 | 100 | 0.9 | 60 | 185 | 766 | 34 | 38111 | Example |
| 15 | 81 | 4 | 15 | 0 | 100 | 0.8 | 64 | 0 | 581 | 31 | 35106 | Comparative example |
| 16 | 65 | 7 | 24 | 0 | 97 | 0.9 | 74 | 556 | 608 | 31 | 35728 | Example |
| 17 | 63 | 8 | 21 | 5 | 96 | 0.8 | 76 | 741 | 575 | 31 | 35099 | Comparative example |
| 18 | 53 | 4 | 38 | 4 | 98 | 0.8 | 72 | 741 | 767 | 32 | 36891 | Example |
| 19 | 66 | 5 | 26 | 1 | 98 | 0.6 | 59 | 1111 | 648 | 29 | 34593 | Comparative example |
| 20 | 70 | 8 | 18 | 2 | 98 | 1.1 | 65 | 185 | 599 | 31 | 35393 | Example |
| 21 | 82 | 3 | 15 | 0 | 100 | 0.9 | 74 | 0 | 512 | 30 | 34048 | Comparative example |
| 22 | 61 | 6 | 20 | 5 | 92 | 0.7 | 75 | 741 | 641 | 31 | 35727 | Example |
| 23 | 81 | 6 | 10 | 3 | 100 | 1.1 | 75 | 1667 | 565 | 30 | 32749 | Comparative example |
| 24 | 70 | 5 | 23 | 1 | 99 | 0.9 | 57 | 185 | 720 | 32 | 36892 | Example |
| 25 | 64 | 2 | 19 | 8 | 93 | 0.5 | 80 | 1111 | 593 | 28 | 33336 | Comparative example |
| 26 | 40 | 6 | 47 | 7 | 100 | 0.7 | 77 | 556 | 909 | 35 | 39820 | Example |
| 27 | 51 | 2 | 30 | 11 | 94 | 0.9 | 73 | 185 | 546 | 29 | 34037 | Comparative example |
| 28 | 52 | 7 | 36 | 4 | 99 | 0.9 | 71 | 741 | 731 | 34 | 38784 | Example |
| 29 | 64 | 6 | 14 | 12 | 96 | 0.8 | 59 | 1296 | 789 | 29 | 36320 | Comparative example |
| 30 | 64 | 6 | 28 | 0 | 98 | 1.1 | 61 | 185 | 600 | 31 | 35122 | Example |
| 31 | 41 | 2 | 56 | 1 | 100 | 0.9 | 75 | 1111 | 599 | 28 | 33733 | Comparative example |
| 32 | 44 | 7 | 46 | 1 | 98 | 1.1 | 66 | 741 | 906 | 36 | 40191 | Example |
| 33 | 41 | 7 | 42 | 5 | 95 | 1.0 | 64 | 1296 | 603 | 29 | 33761 | Comparative example |
| 34 | 54 | 4 | 34 | 7 | 99 | 0.9 | 76 | 370 | 620 | 32 | 36470 | Example |

TABLE 3-continued

| Steel sheet No. | Steel microstructure | | | | | | | Tensile strength TS (MPa) | Collision characteristics | | Note |
| | V(F) (%) | V(RA) (%) | V(TM + B) (%) | V(FM) (%) | V(F + RA + TM + B + FM) (%) | *1 (mass %) | *2 (%) | *3 (/mm$^2$) | | Bending test ΔS (mm) | Axial crushing test $F_{ave}$ (N) | |
|---|---|---|---|---|---|---|---|---|---|---|---|---|
| 35 | 70 | 6 | 16 | 8 | 99 | 0.4 | 75 | 1111 | 592 | 28 | 33799 | Comparative example |
| 36 | 57 | 8 | 33 | 0 | 98 | 1.2 | 70 | 370 | 873 | 34 | 38780 | Example |
| 37 | 57 | 9 | 29 | 3 | 98 | 1.0 | 80 | 1111 | 867 | 29 | 34843 | Comparative example |
| 38 | 65 | 8 | 18 | 7 | 99 | 0.8 | 74 | 370 | 632 | 31 | 35429 | Example |
| 39 | 51 | 5 | 42 | 1 | 99 | 0.9 | 52 | 1296 | 608 | 28 | 34563 | Comparative example |
| 40 | 55 | 9 | 30 | 5 | 99 | 1.0 | 69 | 370 | 855 | 35 | 39021 | Example |
| 41 | 55 | 16 | 27 | 1 | 99 | 1.1 | 49 | 1111 | 831 | 29 | 34622 | Comparative example |
| 42 | 52 | 9 | 37 | 0 | 98 | 1.0 | 74 | 556 | 870 | 35 | 39216 | Example |
| 43 | 42 | 9 | 42 | 0 | 93 | 1.1 | 51 | 926 | 904 | 35 | 39969 | Example |
| 44 | 54 | 6 | 36 | 2 | 99 | 1.2 | 59 | 741 | 731 | 32 | 36672 | Example |
| 45 | 41 | 15 | 35 | 8 | 98 | 0.7 | 72 | 556 | 926 | 36 | 40928 | Example |
| 46 | 48 | 7 | 33 | 10 | 98 | 0.7 | 76 | 370 | 709 | 34 | 38090 | Example |
| 47 | 43 | 12 | 43 | 1 | 99 | 1.2 | 56 | 370 | 951 | 36 | 40839 | Example |
| 48 | 41 | 6 | 43 | 3 | 94 | 1.0 | 71 | 185 | 784 | 32 | 36022 | Example |
| 49 | 54 | 8 | 33 | 3 | 98 | 0.9 | 74 | 556 | 951 | 36 | 40078 | Example |
| 50 | 58 | 8 | 30 | 2 | 98 | 1.0 | 51 | 741 | 727 | 33 | 37240 | Example |
| 51 | 50 | 11 | 31 | 6 | 98 | 0.9 | 66 | 741 | 810 | 34 | 38181 | Example |
| 52 | 55 | 6 | 33 | 4 | 97 | 1.0 | 73 | 926 | 790 | 34 | 38081 | Example |
| 53 | 42 | 11 | 38 | 9 | 100 | 0.8 | 65 | 556 | 928 | 35 | 39991 | Example |
| 54 | 47 | 10 | 36 | 6 | 99 | 0.7 | 72 | 370 | 975 | 37 | 41002 | Example |
| 55 | 53 | 6 | 34 | 5 | 98 | 0.7 | 74 | 556 | 773 | 32 | 36640 | Example |
| 56 | 46 | 8 | 44 | 1 | 99 | 1.1 | 71 | 556 | 850 | 33 | 37942 | Example |
| 57 | 62 | 7 | 24 | 5 | 98 | 0.8 | 75 | 370 | 706 | 32 | 36913 | Example |
| 58 | 66 | 4 | 29 | 1 | 99 | 1.0 | 70 | 370 | 764 | 33 | 37170 | Example |
| 59 | 63 | 6 | 29 | 0 | 98 | 0.9 | 65 | 185 | 645 | 32 | 36518 | Example |
| 60 | 56 | 9 | 24 | 9 | 98 | 0.9 | 73 | 185 | 776 | 33 | 37341 | Example |
| 61 | 49 | 8 | 37 | 6 | 99 | 0.8 | 71 | 556 | 798 | 33 | 37514 | Example |
| 62 | 65 | 9 | 24 | 0 | 98 | 1.1 | 57 | 741 | 671 | 31 | 35557 | Example |
| 63 | 81 | 3 | 14 | 2 | 100 | 0.9 | 73 | 185 | 585 | 30 | 33236 | Comparative example |
| 64 | 54 | 9 | 29 | 4 | 96 | 1.2 | 54 | 1111 | 989 | 29 | 34761 | Comparative example |
| 65 | 44 | 2 | 39 | 7 | 92 | 0.7 | 74 | 1111 | 898 | 29 | 34896 | Comparative example |
| 66 | 82 | 1 | 9 | 7 | 99 | 0.9 | 70 | 556 | 871 | 29 | 33065 | Comparative example |
| 67 | 51 | 21 | 26 | 2 | 100 | 0.8 | 77 | 1296 | 933 | 28 | 34905 | Comparative example |
| 68 | 50 | 9 | 39 | 0 | 98 | 1.1 | 52 | 1111 | 833 | 29 | 34595 | Comparative example |
| 69 | 54 | 7 | 36 | 2 | 99 | 0.9 | 68 | 1111 | 673 | 28 | 34003 | Comparative example |
| 70 | 71 | 4 | 24 | 0 | 99 | 0.9 | 61 | 185 | 582 | 31 | 35932 | Comparative example |
| 71 | 64 | 3 | 21 | 12 | 100 | 1.1 | 64 | 1111 | 831 | 28 | 34590 | Comparative example |

V(F): Area fraction of ferrite, V(TM + B): Total area fraction of tempered martensite and bainite
V(RA): Area fraction of retained austenite, V(FM): Area fraction of fresh martensite
V(F + RA + TM + B + FM): Total area fraction of ferrite, tempered martensite, bainite, retained austenite, and fresh martensite
*1: Solute C content of retained austenite
*2: Ratio of retained austenite grains with an aspect ratio of less than 2.0 to all retained austenite grains
*3: Number density of voids in an L cross section in a 0- to 50-μm region from a surface of a steel sheet on the compression side in 90-degree bending at a curvature radius/thickness ratio of 4.2 in the rolling (L) direction with respect to an axis extending in the width (C) direction The galvanized steel sheets according to the examples had a TS of 590 MPa or more and good collision characteristics. By contrast, the galvanized steel sheets according to the comparative examples had a TS of less than 590 MPa or poor collision characteristics.

Example 2

A galvanized steel sheet of No. 1 (Example) in Table 3 of Example 1 was subjected to press forming to produce a member according to an Example. The galvanized steel sheet of No. 1 in Table 3 of Example 1 and a galvanized steel sheet of No. 3 (Example) in Table 3 of Example 1 were joined together by spot welding to produce a member according to an Example. It was confirmed that a member according to an Example produced by using a steel sheet according to the disclosed embodiments had good collision characteristics and high strength, and that all of the member produced by forming the steel sheet of No. 1 (Example) in Table 3 of Example 1 and the member produced by spot welding the steel sheet of No. 1 in Table 3 of Example 1 and the steel sheet of No. 3 (Example) in Table 3 of Example 1 could be suitably used for automobile frame parts and the like.

Reference Signs List

10 hat-shaped member
20 galvanized steel sheet
30 test member
40 spot weld
50 base plate
60 impactor
A1 die
A2 support rolls
B1 punch
B2 punch
D1 width (C) direction
D2 rolling (L) direction
D3 crushing direction T1 test specimen
T2 test specimen
X0 corner
XA measurement position (measurement region) of void after bending Industrial Applicability The disclosed embodiments can provide a galvanized steel sheet with a TS of 590 MPa or more and with good collision characteristics. The use of a member produced by using a galvanized steel sheet according to the disclosed embodiments as an automotive part can contribute to the reduction of vehicle weight and greatly contribute to improved performance of automobile bodies.

The invention claimed is:

1. A galvanized steel sheet comprising:
a steel sheet having
a chemical composition satisfying an equivalent carbon content Ceq of 0.35% or more and less than 0.60%, and containing on a mass percent basis:
C: 0.03% to 0.20%,
Si: 0.10% to 2.00%,
Mn: 0.5% to 2.5%,
P: 0.05% or less,
S: 0.05% or less,
Sol. Al: 0.005% to 0.100%, and
N: 0.010% or less,
a remainder being composed of Fe and incidental impurities, and
a steel microstructure with an area fraction of ferrite: 40% to 80%, tempered martensite and bainite: 15% to 55% in total, retained austenite: 3% to 20%, fresh martensite: 10% or less, and ferrite, tempered martensite, bainite, retained austenite, and fresh martensite: 90% or more in total; and
a galvanized layer on a surface of the steel sheet,
wherein the retained austenite has a solute C content of 0.6% or more by mass,
retained austenite grains with an aspect ratio of less than 2.0 constitute 50% or more of all retained austenite grains,
in 90-degree bending at a curvature radius/thickness ratio of 4.2 in a rolling (L) direction with respect to an axis extending in a width (C) direction, an L cross section in a 0-to 50-μm region from a surface of the steel sheet on a compression side has a number density of voids of 1000/mm$^2$ or less, and
the galvanized steel sheet has a tensile strength of 590 MPa or more.

2. The galvanized steel sheet according to claim 1, wherein the galvanized layer is an electrogalvanized layer, a hot-dip galvanized layer, or a hot-dip galvannealed layer.

3. A member produced by performing at least one of forming and welding on the galvanized steel sheet according to claim 2.

4. A member produced by performing at least one of forming and welding on the galvanized steel sheet according to claim 1.

5. A method for producing the galvanized steel sheet according to claim 1, comprising:
a hot-rolling step of hot-rolling a steel slab satisfying the equivalent carbon content Ceq of 0.35% or more and less than 0.60% and having the chemical composition at a finish rolling temperature in the range of 850° C. to 950° C. and coiling the resulting hot-rolled steel sheet at a coiling temperature of 600° C. or less;
a cold-rolling step of cold-rolling the hot-rolled steel sheet after the hot-rolling step at a rolling reduction of more than 20%;
an annealing step of heating the cold-rolled steel sheet after the cold-rolling step to an annealing temperature in the range of 720° C. to 860° C. and holding the steel sheet for 30 seconds or more;
a coating step of cooling the steel sheet to the temperature range of 300° C. to 600° C. after the annealing step, holding the steel sheet in the temperature range for 10 to 300 seconds, and then galvanizing a surface of the steel sheet;
a quenching and tempering step of cooling the steel sheet to a finish cooling temperature in the range of (Ms-250° C. to (Ms-50° C.) after the coating step and then holding the steel sheet at a tempering temperature in the range of 300° C. to 500° C. for 20 to 500 seconds; and
a cooling step of cooling the steel sheet from the tempering temperature to 50° C. at an average cooling rate of 20° C/s or more after the quenching and tempering step.

6. A method for producing a member, comprising the step of performing at least one of forming and welding on the galvanized steel sheet produced by the method according to claim 5.

7. The method according to claim 5, wherein the galvanizing is electrogalvanizing, hot-dip galvanizing, or hot-dip galvannealing on a surface of the steel sheet.

8. A method for producing a member, comprising the step of performing at least one of forming and welding on the galvanized steel sheet produced by the method according to claim 7.

9. The galvanized steel sheet according to claim 1, wherein the chemical composition further contains, on a mass percent basis, at least one selected from the group consisting of:
Cr: 1.0% or less,
Mo: 0.5% or less,
V: 0.5% or less,
Ti: 0.5% or less,
Nb: 0.5% or less,
B: 0.005% or less,
Ni: 1.0% or less,
Cu: 1.0% or less,
Sb: 1.0% or less,
Sn: 1.0% or less,
Ca: 0.005% or less, and
REM: 0.005% or less.

10. The galvanized steel sheet according to claim 9, wherein the galvanized layer is an electrogalvanized layer, a hot-dip galvanized layer, or a hot-dip galvannealed layer.

11. A member produced by performing at least one of forming and welding on the galvanized steel sheet according to claim 10.

12. A member produced by performing at least one of forming and welding on the galvanized steel sheet according to claim 9.

13. A method for producing the galvanized steel sheet according to claim 9, comprising:
a hot-rolling step of hot-rolling a steel slab satisfying the equivalent carbon content Ceq of 0.35% or more and less than 0.60% and having the chemical composition at a finish rolling temperature in the range of 850° C. to 950° C. and coiling the resulting hot-rolled steel sheet at a coiling temperature of 600° C. or less;
a cold-rolling step of cold-rolling the hot-rolled steel sheet after the hot-rolling step at a rolling reduction of more than 20%;

an annealing step of heating the cold-rolled steel sheet after the cold-rolling step to an annealing temperature in the range of 720° C.to 860° C. and holding the steel sheet for 30 seconds or more;

a coating step of cooling the steel sheet to the temperature range of 300° C. to 600° C. after the annealing step, holding the steel sheet in the temperature range for 10 to 300 seconds, and then galvanizing a surface of the steel sheet;

a quenching and tempering step of cooling the steel sheet to a finish cooling temperature in the range of (Ms-250° C.) to (Ms-50° C.after the coating step and then holding the steel sheet at a tempering temperature in the range of 300° C. to 500° C. for 20 to 500 seconds; and a cooling step of cooling the steel sheet from the tempering temperature to 50° C. at an average cooling rate of 20° C/s or more after the quenching and tempering step.

14. The method according to claim 13, wherein the galvanizing is electrogalvanizing, hot-dip galvanizing, or hot-dip galvannealing on a surface of the steel sheet.

15. A method for producing a member, comprising the step of performing at least one of forming and welding on the galvanized steel sheet produced by the method according to claim 14.

16. A method for producing a member, comprising the step of performing at least one of forming and welding on the galvanized steel sheet produced by the method according to claim 13.

* * * * *